US012710023B1

(12) United States Patent
Wuerl et al.

(10) Patent No.: US 12,710,023 B1
(45) Date of Patent: Aug. 18, 2026

(54) ROCKET NOZZLE ASSEMBLY WITH SEPARABLE NOZZLE EXTENSION

(71) Applicant: Blue Origin Manufacturing, LLC, Huntsville, AL (US)

(72) Inventors: Adam M. Wuerl, Seattle, WA (US); David Alan Degenhardt, Seattle, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 19/205,821

(22) Filed: May 12, 2025

(51) Int. Cl.
*F02K 9/97* (2006.01)

(52) U.S. Cl.
CPC .................................... *F02K 9/978* (2013.01)

(58) Field of Classification Search
CPC ....................................................... F02K 9/976
See application file for complete search history.

(56) References Cited

U.S. PATENT DOCUMENTS

| | | | |
|---|---|---|---|
| 2,880,576 | A | 4/1959 | Kappus |
| 3,011,309 | A | 12/1961 | Carter |
| 3,122,098 | A | 2/1964 | Glennan |
| 3,135,416 | A | 6/1964 | Royer |
| 3,141,297 | A | 7/1964 | Shields |
| 3,185,090 | A | 5/1965 | Weber |
| 3,352,192 | A | 11/1967 | Webb |
| 3,458,217 | A | 7/1969 | Pride, Jr. et al. |
| 3,576,298 | A | 4/1971 | Barnett |
| 3,706,281 | A | 12/1972 | Hatakeyama |
| 3,711,027 | A | 1/1973 | Carey |
| 3,855,789 | A | 12/1974 | Platzek |
| 4,125,224 | A | 11/1978 | Carey |
| 4,184,238 | A | 1/1980 | Carey |
| 4,213,566 | A | 7/1980 | Miltenberger |
| 4,222,001 | A | 9/1980 | Kofink |
| 4,313,567 | A | 2/1982 | Feight |

(Continued)

FOREIGN PATENT DOCUMENTS

| | | | |
|---|---|---|---|
| CN | 110143297 | A | 8/2019 |
| EP | 2489866 | B1 | 8/2018 |
| FR | 2622931 | A1 | 5/2019 |

OTHER PUBLICATIONS

Paul Ross, "Refurbishment of Space Shuttle SRM Nozzles," 21 st AIAAISAEIASMEIASEE Joint Propulsion Conference, AIAA-85-132, 8-1 Jul. 1, 1985. (Year: 1985).*

(Continued)

*Primary Examiner* — David P. Olynick
(74) *Attorney, Agent, or Firm* — KNOBBE, MARTENS, OLSON & BEAR, LLP

(57) ABSTRACT

Rocket nozzle assembly having a separable outboard nozzle extension for transitioning from a vacuum-optimized to an atmospheric-optimized configuration. The nozzle assembly includes an inboard divergent nozzle section attached at an interface with a detachable outboard divergent nozzle extension. The nozzle and extension are removably attached via a connector, such as a clamp and strap. An actuator causes the connector to release and thereby allow the extension to separate from the nozzle in flight. The nozzle assembly may be used with a reusable second stage rocket that lands on the ground or an ocean platform. The nozzle extension may be replaced in between flights.

14 Claims, 14 Drawing Sheets

(56) References Cited

U.S. PATENT DOCUMENTS

| | | | | |
|---|---|---|---|---|
| 4,383,407 | A | 5/1983 | Inman | |
| 4,387,564 | A | 6/1983 | Carey | |
| 4,557,441 | A | 12/1985 | Aspinall | |
| 4,685,376 | A | 8/1987 | Noel et al. | |
| 4,779,799 | A | 10/1988 | Jencek | |
| 5,035,112 | A | 7/1991 | McGarry et al. | |
| 5,048,289 | A | 9/1991 | Brown | |
| 5,082,202 | A | 1/1992 | Jacobson | |
| 5,318,255 | A | 6/1994 | Facciano et al. | |
| 5,331,894 | A | 7/1994 | Wassell et al. | |
| 5,372,071 | A | 12/1994 | Richards et al. | |
| 5,641,123 | A | 6/1997 | Kishimoto et al. | |
| 6,086,020 | A | 7/2000 | Machiussi | |
| 6,289,818 | B1 | 9/2001 | Mueller et al. | |
| 6,357,699 | B1 | 3/2002 | Edberg et al. | |
| 6,418,710 | B1 | 7/2002 | Perrier et al. | |
| 6,481,198 | B1 | 11/2002 | Hepler et al. | |
| 6,712,542 | B2 | 3/2004 | Buder | |
| 7,922,125 | B2 | 4/2011 | Lancho Doncel | |
| 8,454,056 | B2 | 6/2013 | Fernandes et al. | |
| 8,459,036 | B2 | 6/2013 | Baker | |
| 8,607,705 | B2 | 12/2013 | Golden et al. | |
| 8,979,035 | B2 | 3/2015 | Straumann et al. | |
| 9,731,822 | B1 | 8/2017 | Erian | |
| 11,035,321 | B2 * | 6/2021 | Pichon | F02K 9/64 |
| 2002/0059800 | A1 | 5/2002 | Vuillamy et al. | |
| 2003/0075069 | A1 | 4/2003 | Boucher et al. | |
| 2003/0136128 | A1 | 7/2003 | Groeber et al. | |
| 2005/0016158 | A1 | 1/2005 | Berdoyes et al. | |
| 2007/0012820 | A1 * | 1/2007 | Buehler | B64G 1/14 244/158.9 |
| 2007/0012821 | A1 * | 1/2007 | Buehler | B64G 1/52 244/171.9 |
| 2009/0133405 | A1 * | 5/2009 | Hawkins | F02K 9/974 60/770 |
| 2012/0167575 | A1 | 7/2012 | Dobek et al. | |
| 2014/0102109 | A1 * | 4/2014 | Park | F02K 9/978 60/770 |
| 2014/0131481 | A1 | 5/2014 | Lelong | |
| 2017/0197725 | A1 | 7/2017 | Foo et al. | |
| 2022/0042479 | A1 * | 2/2022 | Whitmore | F02K 9/72 |
| 2023/0331401 | A1 | 10/2023 | Helvajian | |
| 2024/0286769 | A1 | 8/2024 | Behar et al. | |
| 2025/0261805 | A1 | 8/2025 | Hakim et al. | |

OTHER PUBLICATIONS

Juho Lee, et al. “Separation and Release Devices for Aeronautical and Astronautical Systems: A Review,” International Journal of Aeronautical and Space Sciences (2025) 26:131-161, Published online: Sep. 16, 2024. (Year: 2024).*

N.S. Goncharov, et al, “Reusable Launch Vehicle Propulsion Based on the RD-0120 Engine,” AIAA 95-3003, Jul. 10-12, 1995 / SanDiego, CA. (Year: 1995).*

Shivang Khare, et al. “Rocket nozzles: 75 years of research and development,” Sådhanå (2021) 46:76, copy right Indian Academy of Sciences. (Year: 2021).*

Junlan Li, et al, “Dynamic-Envelope Analysis of Clamp-Band Joint Considering Pyroshock of Satellite Separation,” Journal of Spacecraft and Rockets, vol. 51, No. 5, Sep.-Oct. 2014, pp. 1390-1400. (Year: 2014).*

NASA, Extendable Nozzles for Space Engines, vol. I: Program Studies, Report 10484-FR, Nov. 1, 1970.

Dwayne Day, A Bat Outta Hell: the Isinglass Mach 22 Follow-on to Oxcart, Apr. 12, 2010, https://www.thespacereview.com/article/1602/1.

J. E. Erbs and R. R. Stickling, Application of Gas-film-cooled Nozzle Extensions to Large Rocket Engines, Jan. 1, 1967, SAE Transactions vol. 75, Section 2.

* cited by examiner 138
144
181
143
183
182
135
170
170
161
161
160
160
163
163
162
162
126
130
180
180
180
180
164
164
176
177

138
143
183
182
182
144
160
160
161
162
126
130
164
164

ROCKET NOZZLE ASSEMBLY WITH SEPARABLE NOZZLE EXTENSION

BACKGROUND

Field

The technology relates generally to rocket engine nozzles, more specifically to variable length rocket nozzle assemblies that can jettison a nozzle portion.

Description of Related Art

Traditionally, orbital launch vehicles may use multiple stages, such as a first stage rocket and a second stage rocket. For example, an orbital launch vehicle may use a first stage rocket for launch from the earth's surface to a separation altitude. The orbital launch vehicle may then separate the first stage rocket from the second stage rocket and fire the second stage rocket to further ascend to a desired distance from earth in orbit (e.g., an orbiting distance). As such, the second stage rocket is typically used for further ascent after the rocket leaves the atmosphere and is not traditionally operated in dense atmosphere such as at sea level. The second stage rocket traditionally completes its mission (e.g., delivering a payload) in space. After the mission of the second stage rocket is complete, it is typically decommissioned and/or discarded. As such, second stage rockets are traditionally not reusable. There is therefore a need for a reusable second stage, which would decrease costs of subsequent launches. Further, because a reusable second stage may operate first in a vacuum and later in dense atmospheric air, there is a need for a rocket engine having components optimized for use in both environments. Traditional nozzles of second stages are optimized for vacuum environments, but such nozzles are either unusable in the atmosphere or result in suboptimal performance. There is therefore a need for second stage rocket engine nozzles that overcome these and other drawbacks.

SUMMARY

The examples disclosed herein, each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the examples described herein provide advantages over existing approaches to nozzle assemblies for second stage rockets.

The following disclosure describes non-limiting examples of some examples. For instance, other examples of the disclosed systems and methods may or may not include the features described herein. Moreover, disclosed advantages and benefits may apply only to certain examples of the disclosure and should not be used to limit the disclosure.

Systems, devices, and methods are described for a rocket nozzle assembly. In one aspect, the rocket nozzle assembly includes a nozzle having a frustoconical nozzle body that extends axially between an inboard nozzle end and an outboard nozzle end and defines a nozzle channel. The nozzle assembly further includes a nozzle extension having a frustoconical extension body that extends axially from an inboard extension end to an outboard extension end, where the inboard extension end is removably coupled to the outboard nozzle end at an interface via a connector extending annularly about the interface. The frustoconical extension body defines an extension channel that is axially aligned with the nozzle channel. The nozzle assembly further includes an actuator in physical communication with the connector and configured to cause the nozzle extension to detach from the nozzle.

In some examples, the connector comprises a V-band clamp.

In some examples, the connector comprises one or more fasteners.

In some examples, the nozzle channel and the extension channel form a substantially continuous channel when the nozzle extension is coupled to the nozzle.

In some examples, the continuous channel is configured to form a first exhaust plume having a first exit diameter.

In some examples, the nozzle channel, after the extension has separated from the nozzle, is configured to form an exhaust plume having a second exit diameter that is smaller than the first exit diameter.

In some examples, the nozzle and the nozzle extension form a divergent section of the nozzle assembly configured for an initial burn of a second stage rocket engine.

In some examples, the second stage rocket engine is a vacuum optimized rocket engine.

In some examples, the nozzle, after the extension has separated from the nozzle, forms a divergent section of the nozzle assembly configured for a vertical landing burn of a second stage rocket engine in an atmosphere.

In some examples, the actuator comprises a pyrotechnic device.

In some examples, the actuator comprises an explosive shaped charge.

In some examples, the actuator comprises a hydraulic actuator.

In some examples, the actuator comprises an electromechanical actuator.

In some examples, the nozzle comprises a removable portion configured to be replaced on the ground during refurbishment of the nozzle.

In some examples, the outboard nozzle end comprises a nozzle flange that extends radially outward, and wherein the inboard extension end comprises an extension flange that extends radially outward, the nozzle assembly further comprising at least one clamp coupling the nozzle flange and the extension flange together.

In another aspect, a method of operating a rocket includes operating a rocket engine of the rocket in a vacuum thrust mode. The rocket engine includes at least one nozzle assembly having a nozzle removably attached to a nozzle extension. The method includes operating an actuator to release a connector extending annularly about the nozzle assembly to cause the nozzle extension to detach from the nozzle. The method includes operating the rocket engine in an atmospheric thrust mode using the nozzle without the nozzle extension.

In some examples, the vacuum thrust mode comprises fuel burn parameters that cause the rocket engine to expand an exhaust plume to a first diameter at an exit of the nozzle extension, and wherein the atmospheric thrust mode comprises fuel burn parameters that cause the rocket engine to expand the exhaust plume to a second diameter at an exit of the nozzle, and wherein the second diameter is smaller than the first diameter.

In some examples, operating the actuator includes operating a pyrotechnic device to detach an annular clamp.

In some examples, operating the actuator includes operating a shaped explosive charge.

In some examples, the rocket is a second stage rocket. The method further includes launching a first stage rocket that is coupled to the second stage rocket. The method includes separating the first stage rocket from the second stage rocket. The method includes initiating the operating of the rocket engine of the second stage rocket in the vacuum thrust mode.

In some examples, the method further includes landing the second stage rocket. The method includes attaching a new nozzle extension to the nozzle. The method includes re-launching the second stage rocket on a launch vehicle.

In another aspect, a rocket system includes a second stage rocket including one or more second stage rocket engines having a nozzle assembly configured to transform from a vacuum-optimized configuration to an atmospheric-optimized configuration. The nozzle assembly includes a nozzle having a frustoconical nozzle body that extends axially between an inboard nozzle end and an outboard nozzle end and defines a nozzle channel. The nozzle includes a nozzle extension having a frustoconical extension body that extends axially from an inboard extension end to an outboard extension end. The inboard extension end is removably coupled to the outboard nozzle end at an interface via a connector extending annularly about the interface. The extension body defines an extension channel that is axially aligned with the nozzle channel. The system includes an actuator in physical communication with the connector and configured to cause the nozzle extension to detach from the nozzle.

In some examples, the system includes a first stage rocket having one or more first stage rocket engines and configured to be coupled with the second stage rocket to launch the rocket system from within an atmosphere.

In one aspect of the systems and methods disclosed herein, a rocket nozzle assembly is described having a nozzle, a nozzle extension, and an actuator. The nozzle has a frustoconical nozzle body that extends axially between an inboard nozzle end and an outboard nozzle end and defines a nozzle channel. The nozzle extension has a frustoconical extension body that extends axially from an inboard extension end to an outboard extension end. The inboard extension end is removably coupled to the outboard nozzle end at an interface via a connector extending annularly about the interface, and wherein the frustoconical extension body defines an extension channel that is axially aligned with the nozzle channel. The actuator is in physical communication with the connector and configured to cause the nozzle extension to detach from the nozzle. The connector includes a V-band clamp. The nozzle and the nozzle extension are configured for an initial burn of a vacuum-optimized, second stage rocket engine. The nozzle, after the nozzle extension has separated from the nozzle, is configured for a vertical landing burn of the second stage rocket engine in an atmosphere. The actuator includes a pyrotechnic device, an explosive shaped charge, a hydraulic actuator, or an electromechanical actuator. The nozzle includes a removable portion configured to be replaced on a landing surface during refurbishment of the nozzle. The outboard nozzle end includes a nozzle flange that extends radially outward, and wherein the inboard extension end includes an extension flange that extends radially outward, the rocket nozzle assembly further including at least one clamp coupling the nozzle flange and the extension flange together. The connector includes one or more wedge rings. The connector includes one or more clamps and a strap extending circumferentially around at least a portion of the nozzle and the nozzle extension. The actuator includes an explosive bolt, a non-explosive bolt, a clasp, or a reverse pliers mechanism.

In one aspect of the system and methods disclosed herein, a method of operating a rocket is described. The method includes operating a rocket engine of the rocket in a vacuum thrust mode wherein the rocket engine includes at least one nozzle assembly having a nozzle extension removably attached to a nozzle, operating an actuator to release a connector extending annularly about the at least one nozzle assembly to cause the nozzle extension to detach from the nozzle, and operating the rocket engine in an atmospheric thrust mode using the nozzle without the nozzle extension. The vacuum thrust mode includes expanding an exhaust plume to a first diameter at an exit of the nozzle extension, and wherein the atmospheric thrust mode includes expanding the exhaust plume to a second diameter at an exit of the nozzle, and wherein the second diameter is smaller than the first diameter. In some examples, operating the actuator includes operating a pyrotechnic device to detach an annular clamp. In some examples, operating the actuator includes operating an explosive shaped charge. The rocket is a second stage rocket, the method further includes launching a first stage rocket that is coupled to the second stage rocket, separating the first stage rocket from the second stage rocket, and initiating operation of the rocket engine of the second stage rocket in the vacuum thrust mode. The method further includes landing the second stage rocket, attaching a new nozzle extension to the nozzle, and re-launching the second stage rocket on a launch vehicle.

In one aspect of the system and methods disclosed herein, a rocket system is described. The rocket system includes a second stage rocket comprising one or more second stage rocket engines having a nozzle assembly configured to transform from a vacuum-optimized configuration to an atmospheric-optimized configuration. The nozzle assembly includes a nozzle having a frustoconical nozzle body that extends axially between an inboard nozzle end and an outboard nozzle end and defines a nozzle channel, a nozzle extension having a frustoconical extension body that extends axially from an inboard extension end to an outboard extension end, wherein the inboard extension end is removably coupled to the outboard nozzle end at an interface via a connector extending annularly about the interface, and wherein the frustoconical extension body defines an extension channel that is axially aligned with the nozzle channel, and an actuator in physical communication with the connector and configured to cause the nozzle extension to detach from the nozzle. The rocket system further includes a first stage rocket having one or more first stage rocket engines and configured to be coupled with the second stage rocket to launch the rocket system from within an atmosphere. The actuator includes a pyrotechnic device, an explosive shaped charge, a hydraulic actuator, or an electromechanical actuator. The connector includes one or more clamps and a strap extending circumferentially around at least a portion of the nozzle and the nozzle extension.

In one aspect of the systems and methods disclosed herein, a rocket nozzle assembly is described including a nozzle having a frustoconical nozzle body that extends axially between an inboard nozzle end and an outboard nozzle end and defines a nozzle channel; a nozzle extension having a frustoconical extension body that extends axially from an inboard extension end to an outboard extension end, wherein the inboard extension end is removably coupled to the outboard nozzle end at an interface via a connector extending annularly about the interface, and wherein the frustoconical extension body defines an extension channel that is axially aligned with the nozzle channel; and an actuator in physical communication with the connector and configured to cause the nozzle extension to detach from the nozzle.

In some examples, the connector includes a V-band clamp. In some examples, the nozzle and the nozzle extension are configured for an initial burn of a vacuum-optimized, second stage rocket engine. In some examples, the nozzle, after the nozzle extension has separated from the nozzle, is configured for a vertical landing burn of the second stage rocket engine in an atmosphere. In some examples, the actuator includes a pyrotechnic device, an explosive shaped charge, a hydraulic actuator, or an electromechanical actuator. In some examples, the nozzle includes a removable portion configured to be replaced on a landing surface during refurbishment of the nozzle. In some examples, the outboard nozzle end includes a nozzle flange that extends radially outward, and wherein the inboard extension end includes an extension flange that extends radially outward, the rocket nozzle assembly further including at least one clamp coupling the nozzle flange and the extension flange together. In some examples, the connector includes one or more wedge rings. In some examples, the connector includes one or more clamps and a strap extending circumferentially around at least a portion of the nozzle and the nozzle extension. In some examples, the actuator includes an explosive bolt, a non-explosive bolt, a clasp, or a reverse pliers mechanism.

In one aspect of the systems and methods disclosed herein, a method is described including: operating a rocket engine of a rocket in a vacuum thrust mode, wherein the rocket engine includes at least one nozzle assembly having a nozzle extension removably attached to a nozzle; operating an actuator to release a connector extending annularly about the at least one nozzle assembly to cause the nozzle extension to detach from the nozzle; and operating the rocket engine in an atmospheric thrust mode using the nozzle without the nozzle extension.

In some examples, the vacuum thrust mode includes expanding an exhaust plume to a first diameter at an exit of the nozzle extension, and wherein the atmospheric thrust mode includes expanding the exhaust plume to a second diameter at an exit of the nozzle, and wherein the second diameter is smaller than the first diameter. In some examples, operating the actuator includes operating a pyrotechnic device to detach an annular clamp. In some examples, operating the actuator includes operating an explosive shaped charge. In some examples, the rocket is a second stage rocket, the method further including: launching a first stage rocket that is coupled to the second stage rocket; separating the first stage rocket from the second stage rocket; and initiating operation of the rocket engine of the second stage rocket in the vacuum thrust mode. In some examples, the method further includes landing the second stage rocket; attaching a new nozzle extension to the nozzle; and re-launching the second stage rocket on a launch vehicle.

In one aspect of the systems and methods disclosed herein, a rocket system is described including: a second stage rocket including one or more second stage rocket engines having a nozzle assembly configured to transform from a vacuum-optimized configuration to an atmospheric-optimized configuration, wherein the nozzle assembly includes: a nozzle having a frustoconical nozzle body that extends axially between an inboard nozzle end and an outboard nozzle end and defines a nozzle channel; a nozzle extension having a frustoconical extension body that extends axially from an inboard extension end to an outboard extension end, wherein the inboard extension end is removably coupled to the outboard nozzle end at an interface via a connector extending annularly about the interface, and wherein the frustoconical extension body defines an extension channel that is axially aligned with the nozzle channel; and an actuator in physical communication with the connector and configured to cause the nozzle extension to detach from the nozzle.

In some examples, the rocket system further includes a first stage rocket having one or more first stage rocket engines and configured to be coupled with the second stage rocket to launch the rocket system from within an atmosphere. In some examples, the actuator includes a pyrotechnic device, an explosive shaped charge, a hydraulic actuator, or an electromechanical actuator. In some examples, the connector includes one or more clamps and a strap extending circumferentially around at least a portion of the nozzle and the nozzle extension.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. Other examples may be utilized, and other changes may be made without departing from the spirit or scope of the subject matter presented here. It will be readily understood that the aspects of the present disclosure, as generally described herein, and illustrated in the drawings, may be arranged, substituted, combined, and designed in a wide variety of different configurations, all of which are explicitly contemplated and make part of this disclosure.

DETAILED DESCRIPTION

Figure 1:
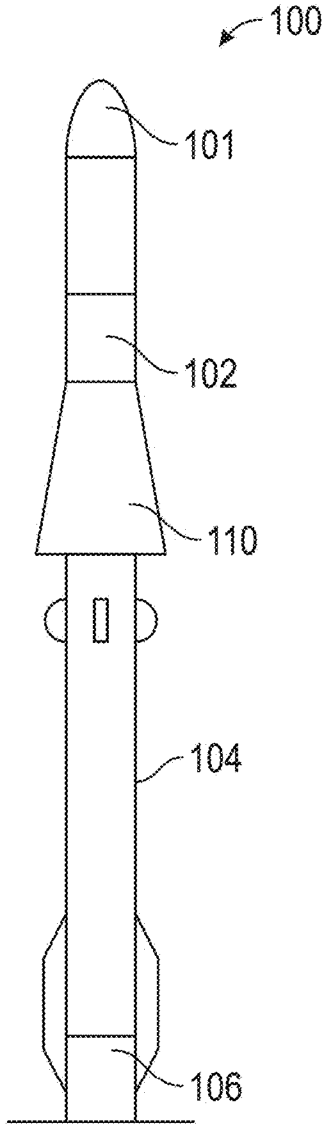
FIG. 1 is a side view of an example of a rocket system that includes a first stage rocket and a second stage rocket having a nozzle assembly with a separable nozzle extension.

The following detailed description is directed to certain specific examples for devices, systems, and methods related rocket nozzle systems having separable nozzle extensions. In this description, reference is made to the drawings wherein like parts or steps may be designated with like numerals throughout for clarity. Reference in this specification to "one example," "an example," or "in some example" means that a particular feature, structure, or characteristic described in connection with the example is included in at least one example of the disclosure. The appearances of the phrases "one example," "an example," or "in some examples" in various places in the specification are not necessarily all referring to the same example, nor are separate or alternative examples necessarily mutually exclusive of other examples. Moreover, various features are described which may be exhibited by some examples and not by others. Similarly, various requirements are described which may be requirements for some examples but may not be requirements for other examples. Reference will now be made in detail to examples of the disclosure, examples of which are illustrated in the accompanying drawings. Wherever possible, the same reference numbers will be used throughout the drawings to refer to the same or like parts.

It is desirable to operate reusable rockets for multiple launches and missions. As such, it is further desirable to reuse as many portions of a rocket as possible to minimize cost of missions and promote efficiency. Because rocket assemblies are often operated in multiple stages, it may be desirable to reuse as many of the rocket stages as possible for multiple missions. For example, a rocket may include a first stage with a fuel supply and engine assembly for an initial launch burn and/or other functions, and a second stage with a separate fuel supply and engine assembly for a continued ascent burn and/or other functions. It may be desirable to retain both the first stage and the second stage for multiple missions. While some rockets have disposable first stages and second stages, some rockets instead have reusable first stages that may be landed on earth after a mission which allows the first stage to be reusable. It is desirable to also have a reusable second stage that may be landed on earth after a mission as well.

To promote reusability, rockets may use propulsion for ascent and controlled landing. Rockets used for ascent have different operational requirements from rockets used for landing. It is however desirable to use the same second stage rocket engine(s) for the ascent burn and for deceleration and landing in order to maintain feasible weight and volumetric constraints for some rocket designs. This dual use of the second stage rocket engine(s) may make the second stage reusable such that the second stage may complete a mission and land back on a surface such as earth and be used again for subsequent launches without requiring a dedicated landing engine, (e.g., an engine that is separate from the ascent burn engine). However, it is desirable for the rocket to be optimized differently for ascent burn conditions, and for deceleration and landing conditions. The main ascent burn of the second stage rocket occurs mostly or entirely in vacuum, where to maximize performance, the engines may highly expand an exhaust plume using a relatively long and wide nozzle. But using such a long and wide nozzle in the atmosphere during landing would result in a plume that would be overexpanded for atmospheric conditions. The overexpanded plume could lead to catastrophic damage to the engine and/or vehicle. As such, it is desirable to adjust the nozzle configuration, such as changing the length and/or exit diameter of the nozzle, to alternately optimize for space flight in mostly vacuum and landing in an atmosphere.

To address these problems, the present disclosure relates to a second stage rocket that includes a nozzle extension configured to be jettisoned from the inboard integral nozzle portion optimized for landing in a non-vacuum environment. The extension may be installed on the second stage rocket prior to launch and used during ascent. The extension may then be jettisoned before landing burn using an actuator. A connector may releasably secure the extension to the nozzle. The actuator may cause the connector to release the extension.

Example Launch Vehicle

A rocket launch vehicle system having a nozzle assembly that includes an extension that may be jettisoned is described. The rocket system is provided to optimize the flow characteristics of the second stage rocket engine used for main ascent (e.g., in vacuum). The system is additionally provided to optimize the flow characteristics of that same second stage rocket engine for use during landing (e.g., in atmosphere). As mentioned above, launch engines with fixed nozzles have different exhaust plume characteristics for vacuum ascent and atmospheric landing. By providing for different physical nozzle characteristics of the same nozzle assembly, the exhaust may be optimally expanded in both environments. The nozzle without the extension provides a relatively shorter nozzle with an outlet having relatively smaller area for a controlled burn in the atmosphere, whereas the extension provides a relatively longer nozzle with an outlet having a relatively larger area for ascent and propulsion outside the atmosphere. The system also provides a lightweight jettison mechanism to remove the extension from the nozzle, thereby adjusting the nozzle parameters.

FIG. 1 shows an example of a rocket system 100 having a first stage rocket 104 and a second stage rocket 102. A payload 101 may be carried by the second stage rocket 102. The first stage rocket 104 may launch the rocket system 100 from ground to a first altitude. The first stage rocket 104 may then separate from the second stage rocket 102. The first stage rocket 104 may then land back on earth for reuse. The second stage rocket 102 may then propel the payload 101 to a second, higher altitude, which may be along an orbital path. The second stage rocket 102 may then separate from the payload and land back on earth for reuse. The payload may continue its path and/or propel itself to a higher, third altitude and/or different orbit. The rocket system 100 is provided to complete multiple extraplanetary missions. As such, the first stage rocket 104 and the second stage rocket 102 are reusable rockets that may be utilized for multiple missions.

Example First Stage Rocket

The first stage rocket 104 may provide the initial ascent from a planetary surface such as the earth's surface. The first stage rocket 104 shown in FIG. 1 includes propellant tanks therein and one or more first stage rocket engines 106. The first stage rocket engines 106 may be configured for atmospheric launch operation. The first stage rocket 104 may have any number of rocket engines suitable for the application, size of the rocket system 100, and payload of a mission. For example, the first stage rocket 104 may have one, two, three, four, five, six, seven, eight or more rocket engines. In some examples, the first stage rocket 104 includes a forward nose portion configured to receive an aft portion of the second stage rocket 102 to transport the second stage rocket 102 through at least a portion of a main ascent to the separation altitude where the second stage rocket 102 separates from the first stage rocket 104. The first stage rocket 104 then lands back on earth and may be reused for subsequent launches. The second stage rocket 102, after separation from the first stage rocket 104, further propels the payload 101.

Example Second Stage Rocket

Figures 2A, 2B:
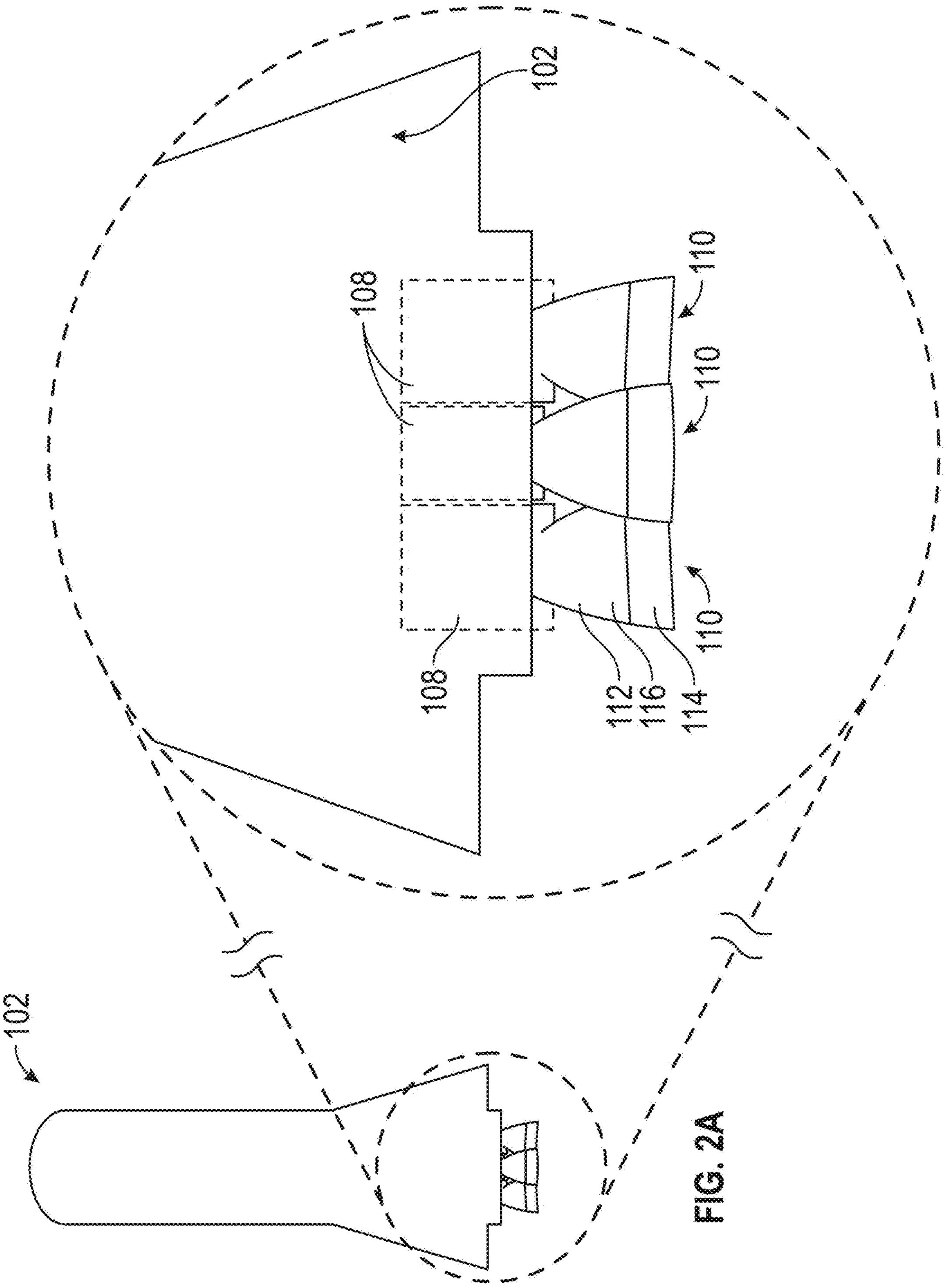
FIGS. 2A and 2B are respectively a side view of the second stage rocket and a closeup side view of examples of nozzle assemblies with separable nozzle extensions and that may be used with the second stage rocket.

FIG. 2A shows a side view of an example of the second stage rocket 102, and FIG. 2B shows a closeup side view of the aft end of the second stage rocket 102 showing a plurality of nozzle assemblies 110. In some examples, the plurality of nozzle assemblies 110 can be a rocket nozzle assembly. In some examples, there may be one, two, three, four, five, six, seven, eight, or more rocket engines 108 and/or nozzle assemblies 110. The second stage rocket 102 shown in FIGS. 1 and 2A includes therein four second stage rocket engines 108 (as also shown individually and schematically in FIGS. 3A and 3B), each including the nozzle assembly 110. As shown in FIG. 2B, each nozzle assembly 110 may have a nozzle 112 with an integral nozzle body 116 and a separable nozzle extension 114, as further described. In some examples, the integral nozzle body 116 is disposed inboard of the nozzle extension 114 such that the nozzle body 116 is axially disposed between the second stage rocket engine 108 and the nozzle extension 114. Further, the nozzle extension 114 is disposed outboard of the nozzle body 116, such that the nozzle extension 114 is disposed axially farther from the engine than the nozzle body 116. As shown, there may be four nozzle assemblies 110 (three of the nozzle assemblies 110 are visible).

The nozzle assemblies 110 may be used with the second stage rocket 102. As described above, the second stage rocket 102 is provided to propel itself through at least a portion of a main ascent after the second stage rocket 102 is separated from the first stage rocket 104. The second stage rocket 102 may then propel into orbit, e.g., for releasing a payload into orbit, using the nozzle assembly 110 having the nozzle body 116 and nozzle extension 114. The second stage rocket 102 may propel the payload 101, for example into a transfer orbit for travel of the payload 101 to another orbit and/or toward another planetary body.

The second stage rocket 102 may then separate from the payload 101 and release the nozzle extension 114 from the nozzle body 116 for a reentry and landing configuration. The second stage rocket 102 may decelerate during planetary reentry and safely land on earth during a landing sequence using the shortened nozzle assembly 110 without the nozzle extension 114. In some examples, the second stage rocket 102 prior to jettisoning the nozzle extension 114 may continue to another planetary body, such as the moon, and land on the other planetary body. In such case, the second stage rocket 102 may re-launch from the planetary body, return to earth, and jettison the nozzle extension 114 upon reaching a particular density of air within the earth's atmosphere.

Figure 2D:
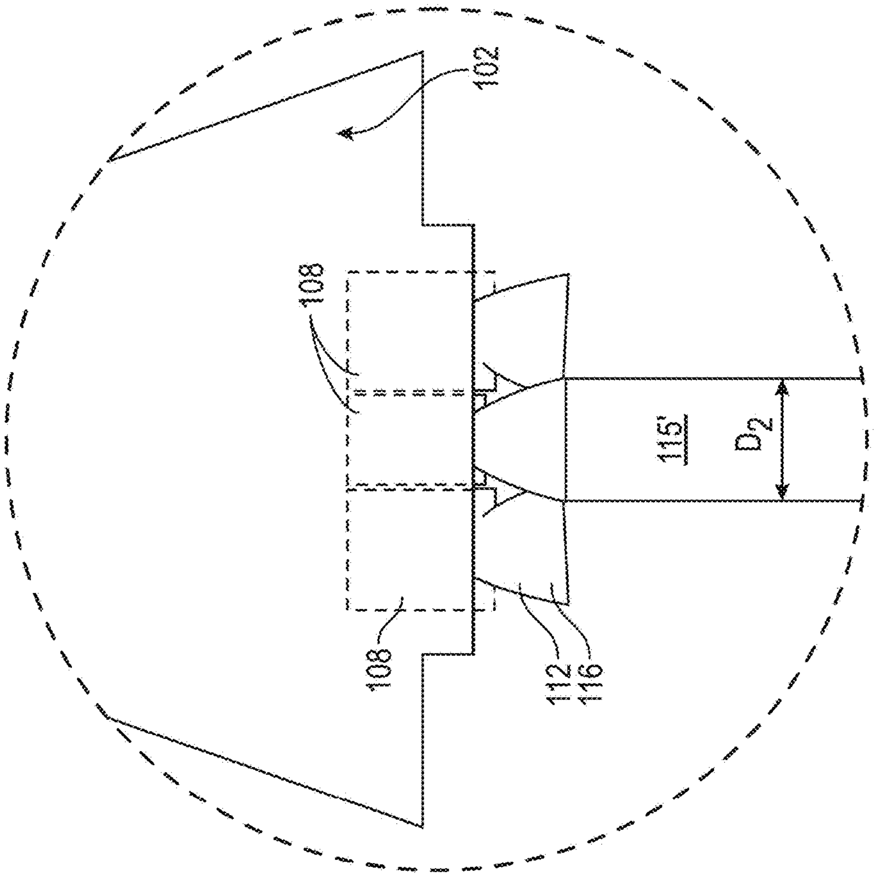
FIGS. 2C and 2D are side views respectively of the nozzle assembly of FIG. 2B with and without the nozzle extensions with corresponding relatively wider and narrower exit diameters and exhaust plumes.
Figure 2C:
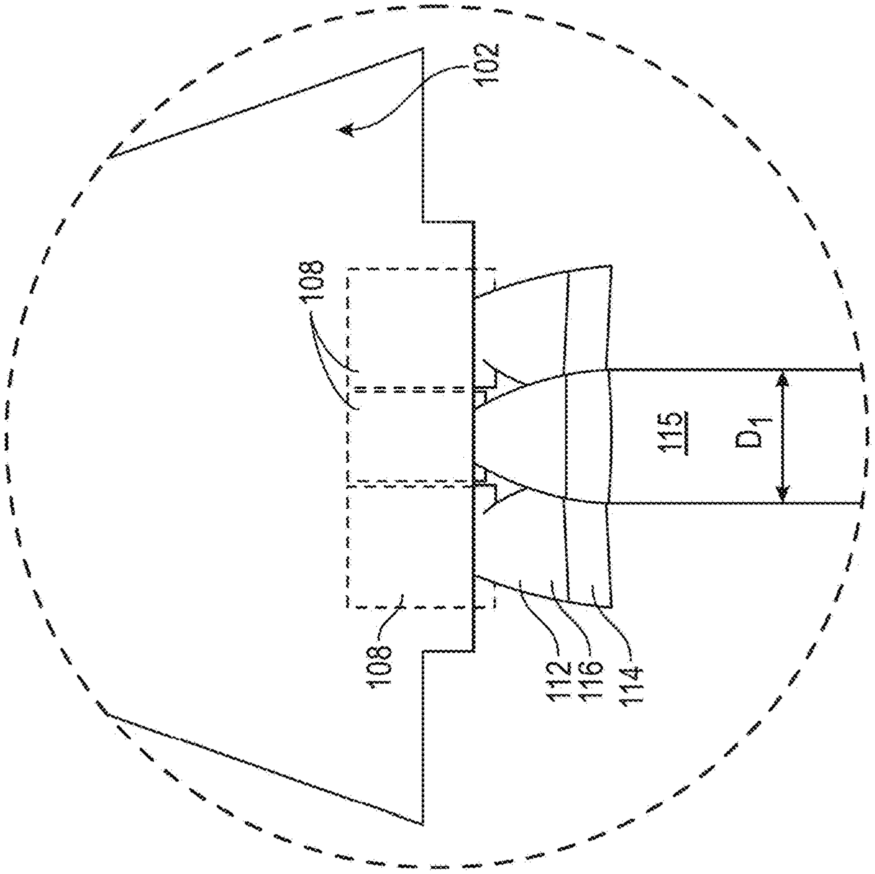

The second stage rocket engines 108 may be vacuum-optimized rocket engines. The rocket engines 108 may be configured to provide thrust outside of an atmosphere such as the earth's outer atmosphere and/or in vacuum surrounding earth. In some examples, the rocket engines 108 are configured to utilize one or more of liquid hydrogen or liquid oxygen for propellant. The nozzle assemblies 110 of the second stage rocket engines 108 have first configurations that include the nozzle extension 114. This first configuration may be configured to have an optimally expanded exhaust plume 115 for operation in such environments. The nozzle assemblies 110 may have second configurations without the nozzle extension 114. The second configuration may be configured to produce exhaust plumes 115' that are atmosphere-optimized. Each of the second stage rocket engines 108 shown in FIG. 2B may include a substantially identical nozzle assembly 110 with similar performance characteristics, sizes, thrust, etc. For example, although FIGS. 2C-2D illustrate a single expanded exhaust plume 115 and a single exhaust plume 115, respectively, each nozzle 112 can include a respective exhaust plume 115. In some examples the second stage rocket engines 108 may have different kinds of nozzle assemblies, e.g., with different performance characteristics, sizes, thrust, etc., suitable for the application, size of the rocket, and payload of a mission.

The nozzle extension 114 may detach from the nozzle assembly 110 at a particular location along the length of the nozzle 112. Different examples may include the extension detaching at different locations and/or using different detachment mechanisms, as further described.

Example Nozzle Assembly

Figure 3A:
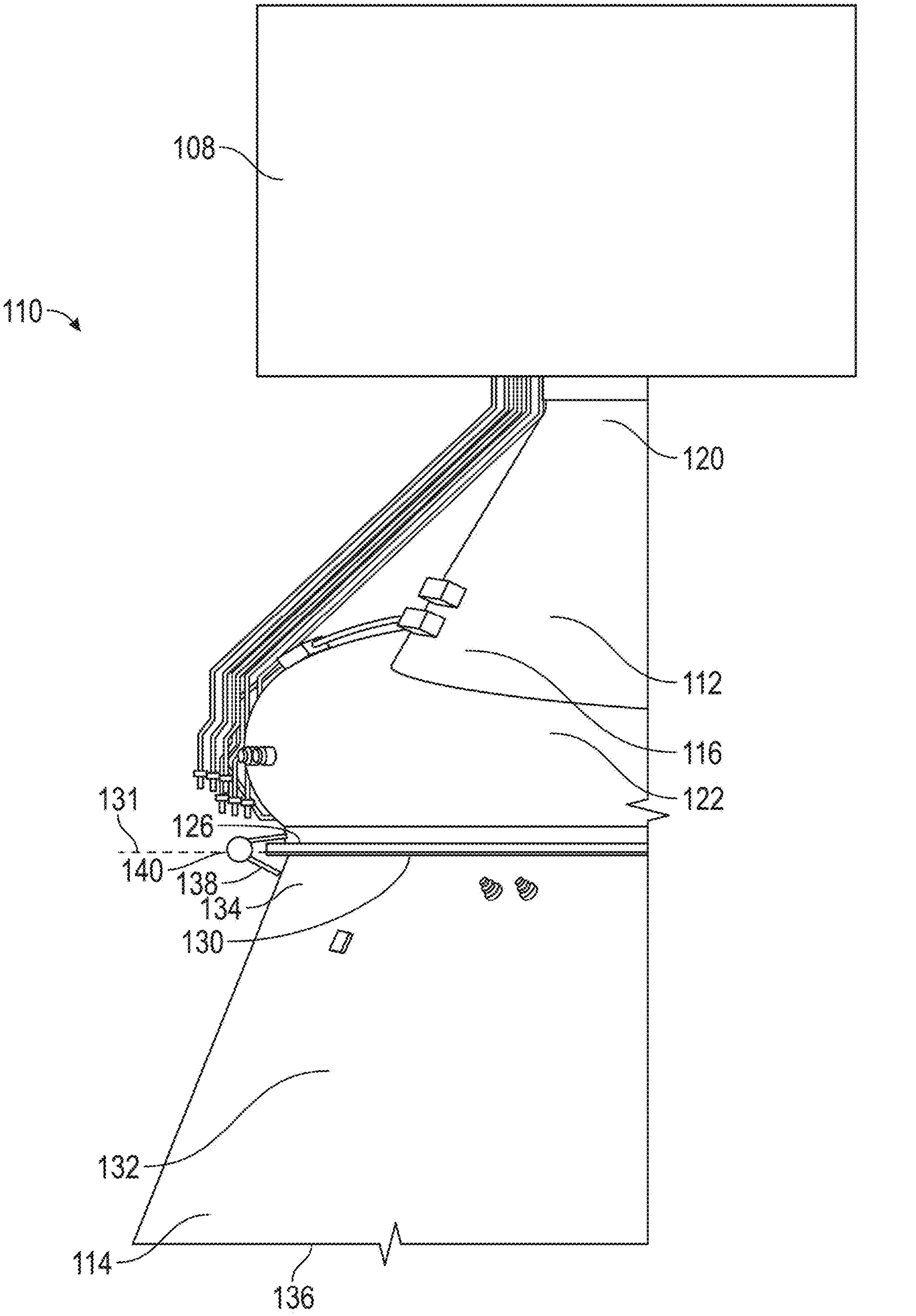
FIGS. 3A and 3B are respectively a detail partial view of a first and second example of a portion of a nozzle assembly having a separable nozzle extension that may be used with the second stage rockets of FIGS. 1, 2A and 2B.
Figure 3B:
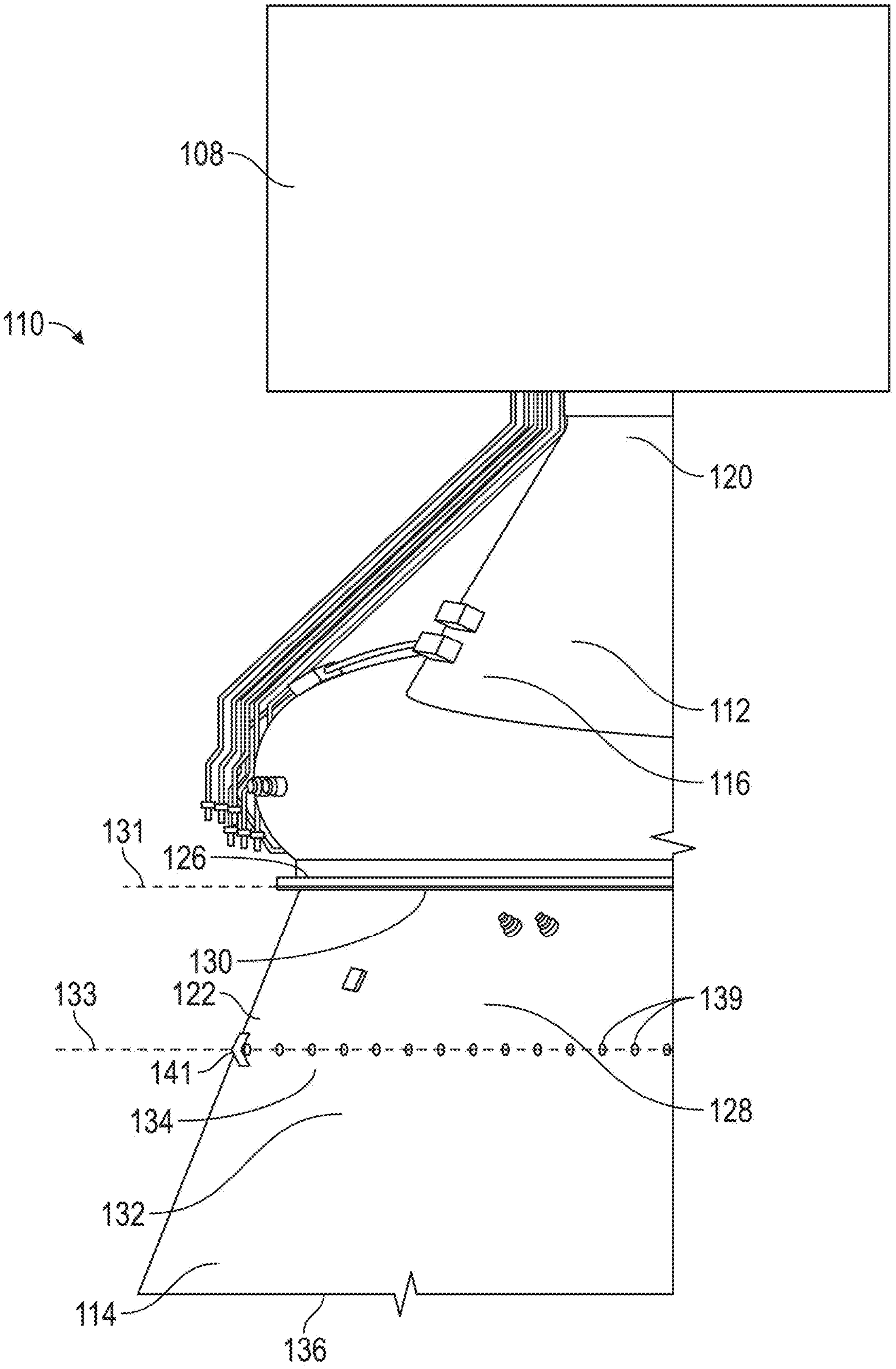
Figure 3C:
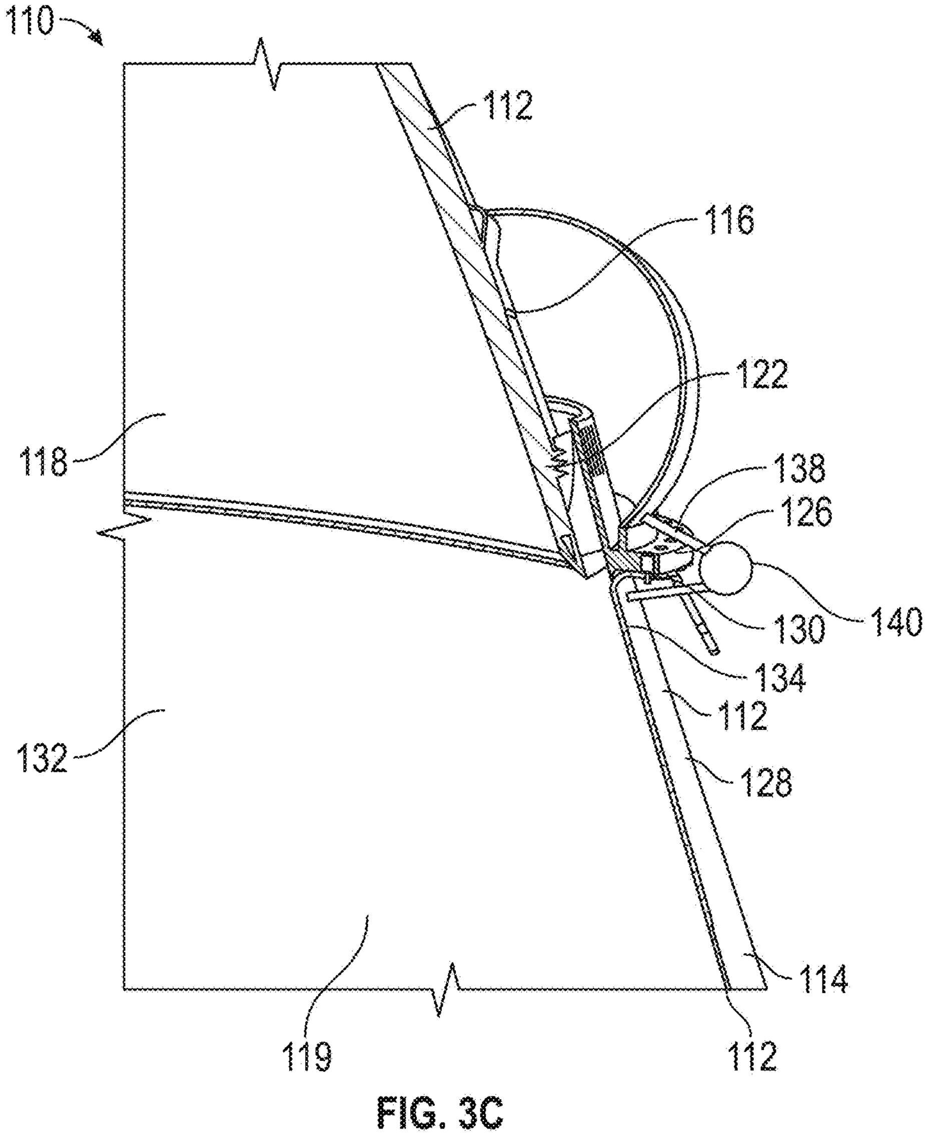
FIG. 3C is a partial cross-section side view of an example of a portion of a nozzle assembly having a separable nozzle extension releasably secured to an inboard nozzle by a connector and jettison actuator that may be used with the second stage rockets herein.

FIGS. 3A-3C show examples of one of the nozzle assemblies 110 and the second stage rocket engine 108 (shown schematically) in isolation from the rest of the second stage rocket 102. FIGS. 3A and 3B show two different examples of nozzle assemblies 110 having detachable nozzle extensions 114, where the nozzle extensions 114 detach from different locations of the nozzle assembly 110, as further described. As shown in FIG. 3A, the nozzle extension 114 may detach at a relatively forward interface such as an inboard interface 131. As shown in FIG. 3B, the nozzle extension 114 may detach at a relatively aft interface such as an outboard interface 133. The various examples of the nozzle extensions 114 may detach using similar or different detachment mechanisms, as further described. FIG. 3C is a partial cross-section view of an example of the nozzle assembly 110 of FIG. 3A.

The nozzle assembly 110 is configured to direct exhaust gasses from the second stage rocket 102 to propel the second stage rocket 102 in a direction opposite the exhaust gasses during various operational stages. The nozzle assembly 110 is configured to direct exhaust gasses in a vacuum thrust mode during ascent and thereby propel the second stage rocket 102 through space and/or low-density atmosphere during a mission. The nozzle assembly 110 may be further configured to direct exhaust gasses to decelerate and/or stabilize the second stage rocket 102 in an atmospheric thrust mode during reentry and/or landing, which allows reuse of the second stage rocket 102.

The nozzle assembly 110 expels the exhaust gasses at various optimal nozzle configurations depending on whether the second stage rocket 102 is being operated in the vacuum thrust mode or the atmospheric thrust mode. As such, the nozzle assembly 110 is adjustable to form desired configurations, such as different nozzle exit diameters and nozzle lengths, for when the second stage rocket 102 transitions between operating within a vacuum and/or upper atmosphere, and during reentry and/or within denser portions of the atmosphere. For example, as shown in FIG. 2C, the nozzle assembly 110 may have a first configuration that includes the nozzle extension 114, having a first exit diameter D1. The first exit diameter D1 can be a larger nozzle exit diameter. The nozzle extension 114 can increase the overall nozzle length. The larger nozzle exit diameter and increased overall nozzle length can produce a desired exhaust plume 115 size for operation within the upper atmosphere and/or in vacuum. This may produce an expanded exhaust plume 115 optimized for low density or vacuum environments. The nozzle assembly 110 may have a second configuration, as shown in FIG. 2D, that does not include the nozzle extension 114, having a second exit diameter D2. The second exit diameter D2 can be a smaller nozzle exit diameter and overall nozzle length, to produce a desired exhaust plume 115' size for operation within denser atmosphere, for instance during reentry and landing on earth. The desired exhaust plume 115' size can prevent nozzle flow separation which could result in an unsuccessful burn or engine damage.

As shown in FIGS. 3A-3C, the nozzle assembly 110 includes a nozzle 112 having an integral nozzle body 116 releasably attached to a separable nozzle extension 114. The nozzle 112 may be a divergent section of the nozzle assembly 110. The nozzle assembly 110 may include a convergent section inboard or upstream of the nozzle 112.

The nozzle extension 114 may be joined with and detach from the nozzle body 116 at the inboard interface 131 (FIG. 3A) or at the outboard interface 133 (FIG. 3B). The nozzle body 116 may be frustoconical. Accordingly, the nozzle body 116 can be referred to as a frustoconical nozzle body. The nozzle body 116 may define a divergent nozzle channel 118 (see FIG. 3C) therein and extend from an inboard nozzle end 120 to an outboard nozzle end 122. The outboard nozzle end 122 may be at the different locations shown in FIGS. 3A and 3B depending on the location of the respective detachment interface 131, 133. The nozzle extension 114 may extend from an inboard extension end 134 to an outboard extension end 136. The inboard extension end 134 may releasably attach to the outboard nozzle end 122 at the respective interface such as the inboard interface 131 (FIG. 3A) or the outboard interface 133 (FIG. 3B). The inboard extension end 134 may be at the different locations shown in FIGS. 3A and 3B depending on the location of the respective detachment interface 131, 133. The nozzle assembly 110 may release the nozzle extension 114 from the nozzle body 116 to be configured for reentry and/or landing burns of the second stage rocket engine 108 in an atmosphere such as the earth's atmosphere.

The nozzle 112 may include a nozzle flange 126. The nozzle flange 126 may be configured for coupling with a corresponding extension flange 130 of the nozzle extension 114. The nozzle flange 126 may extend annularly about and radially outwardly from the nozzle 112 at or near the outboard nozzle end 122. The extension flange 130 may extend annularly about and radially outwardly from the nozzle extension 114 at or near the inboard extension end 134. In some examples, the nozzle flange 126 and/or extension flange 130 may include one or more holes to receive a fastener (e.g., screw or bolt) to connect the flanges 126, 130 together. In some examples, such as the example shown in FIG. 3B, the nozzle 112 includes a divergent section outboard of the nozzle flange 126, such that the outboard nozzle end 122 is spaced apart in an inboard direction from the outboard extension end 136. In some examples, the nozzle assembly 110 does not include a nozzle flange 126 and other suitable attachments may be used to connect the nozzle 112 to the nozzle extension 114.

The nozzle 112 may be formed from materials such as copper; steel; metallic alloys comprised of nickel, chromium, tungsten, or other metals; refractory metals and alloys, carbon composites, or other high-temperature materials. In some examples, the nozzle 112 may be regeneratively cooled, cooled by a coolant film, and/or absorb and/or re-radiate heat during operations. The inboard nozzle end 120 has a diameter suitable to receive exhaust gas from an engine into the nozzle channel 118, and the outboard nozzle end 122 has a diameter suitable to expel exhaust from the rocket engine into an atmosphere. For example, the diameter of the integral nozzle end 122 may be sized such that the nozzle exit pressure when configured for landing is near the ambient atmospheric pressure (e.g., 14.7 psi on Earth at sea-level). The diameter of the inboard extension end 134 may be sized to match the area of integral nozzle end 122 when coupled together with the integral nozzle end 122. For example, the outboard nozzle end 122 diameter may be from 30 to 50 inches, from 35 to 45 inches, about 42 inches, or 42 inches.

Example Separable Nozzle Extension

The nozzle extension 114 provides a removable portion of the nozzle assembly 110. As further shown in FIGS. 3A-3C, the nozzle extension 114 includes a frustoconical extension body 132. The extension body 132 may define an extension channel 119 therein (see FIG. 3C). The extension channel 119 may diverge and continue the diverging contour of the inboard nozzle channel 118. The extension body 132 may extend between the inboard extension end 134 and the outboard extension end 136. Prior to removal of the nozzle extension 114, the size of the nozzle assembly 110 is optimized for operation in an outer atmosphere and/or a vacuum. The nozzle extension 114 may then be discarded for operation of a relatively smaller nozzle assembly 110 inside of an atmosphere or denser atmosphere, such as earth's lower atmosphere.

In some examples, as shown in FIG. 3A, the nozzle extension 114 may include the extension flange 130 that extends annularly around the nozzle extension 114 and radially outwardly from or near the inboard extension end 134. The extension flange 130 may be secured with the nozzle flange 126 via a connector 138, such as a V-band clamp as shown, or other clamps or mechanisms as further described. In some examples, the extension flange 130 may include at least one hole to receive a releasable fastener (e.g., separation nut device) to releasably couple the extension flange 130 to the nozzle flange 126. In other examples, the nozzle extension 114 may not include an extension flange 130, and the nozzle 112 and the nozzle extension 114 may be releasably attached using other mechanisms. The nozzle extension 114 may be formed from materials such as inexpensive sheet metal, steel; metallic alloys comprised of metals such as nickel, chromium, tungsten; refractory metals and refractory metal alloys, carbon composites, or other high-temperature materials. In some examples, the nozzle extension 114 may be a film cooled nozzle extension that includes a coolant film to cool the nozzle assembly 110 during operation and/or absorb and/or re-radiate heat during operations.

The inboard extension end 134 has a diameter suitable to receive exhaust gas from the nozzle 112 into the extension channel 119, and the outboard extension end 136 has a diameter suitable to expel exhaust gas for propulsion in an outer atmosphere or a vacuum for ascent. For example, the outboard extension end 136 diameter may be from 80 to 120 inches, from 90 to 110 inches, from 95 to 105 inches, about 99 inches, or 99 inches. In some examples, the nozzle extension 114 may provide an exit pressure of between 0.3 atmospheres (Atm) to 0.4 Atm, or no greater than 0.37 Atm.

Example Connectors

As shown in FIG. 3A, the nozzle assembly 110 may include at least one connector 138. The connector 138 may extend annularly around the inboard interface 131. The connector 138 may be a structural securement component or components. The connector 138 may be configured to secure the nozzle extension 114 to the nozzle 112 during initial operation of the second stage rocket 102 in the upper atmosphere and/or in vacuum. As such, the connector 138 may couple the nozzle extension 114 to the nozzle 112 during at least some stages of a mission. As shown in FIG. 3A, the connector 138 may be a V-band clamp.

The connector 138 may be disposed about at least a portion of the nozzle flange 126 at the outboard nozzle end 122 and about the extension flange 130 about the inboard extension end 134. For example, the connector 138 may be annularly disposed around the outboard nozzle end 122 and the inboard extension end 134 coupling the nozzle 112 and the nozzle extension 114 together. The two flanges 126, 130 may include two opposing flat surfaces that abut each other and are held together via the connector 138. The connector 138 may be a pipe clamp, a ring clamp, a band clamp, a Marman clamp, or other suitable connector. The connector 138 may be disposed around additional releasable fasteners such as releasable bolts that further releasably couple the nozzle extension 114 to the nozzle 112. The connector 138 may be released via an actuator, such as a separation nut or other device, as further described.

In the example shown in FIG. 3B, a plurality of connectors 139 are shown as a plurality of detachable fasteners, such as rivets (for clarity, only some of the connectors 139 are labelled in the figure). The connectors 139 may include the fasteners disposed around at least a portion of the outboard nozzle end 122. The connectors 139 may be frangible components. An actuator, such as a linear shape charge, may cause the connectors 139 to break to allow separation of the nozzle extension 114, as further described. In some examples, the actuator can be an explosive shaped charge.

The nozzle assembly 110 may include either the connector 138 as shown in FIG. 3A or the connectors 139 as shown in FIG. 3B. In some examples, the nozzle assembly 110 may include both the connectors 138 and 139. In some examples, the connectors 138 and 139 may be located at the same detachable interface, or at different interfaces. Multiple connectors may provide reliability and robustness to the design.

As shown in FIG. 3B, in some examples the nozzle extension 114 may include an outboard interface 133 that is separated during flight and another inboard interface 131 for replacing the outboard, partially detached extension. For instance, the nozzle extension 114 may be released along the outboard interface 133 during flight, such as via the actuator 141, and a remaining removable portion such as an intermediate nozzle extension 128 may be replaced after landing. The intermediate nozzle extension 128 may thus be retained on the nozzle assembly 110 during missions after separation of the nozzle extension 114. The intermediate nozzle extension 128 may then be removed from the nozzle 112 along the inboard interface 131, for example via the detachable flanges 126, 130, and disposed of on the ground between missions during refurbishment. As such, the intermediate nozzle extension 128 may withstand forces such as detonation of shaped charges, without damaging portions of the second stage rocket 102 that are intended for continued use on multiple missions. The intermediate nozzle extension 128 may extend from the nozzle flange 126 of the nozzle 112 to a nozzle location inboard of the outboard extension end 136. The intermediate nozzle extension 128 may include the extension flange 130 for coupling the intermediate nozzle extension 128 to the nozzle flange 126 of the nozzle 112.

In some examples, the actuator 141 in FIG. 3B may be an explosive shaped charge. The actuator 141 may be directed to the outboard nozzle end 122. The actuator 141 may be a C-4 shaped charge that includes a housing band with a V-shaped cross section configured to direct explosive force to a desired point or points on the nozzle assembly 110. The actuator 141 may be coupled to an electronic ignition, which may detonate the explosive charge at a desired time of separation. The actuator 141 may include the charge disposed about the outboard interface 133. The actuator 141 may extend along the outboard nozzle end 122, the inboard extension end 134, and the connectors 139 such that the nozzle extension 114 is disconnected when the force from the actuator 141 impacts the nozzle extension 114 and/or the connectors 139.

Example Actuators

As shown in FIG. 3A, the nozzle assembly 110 may include an actuator 140. The actuator 140 may be in physical communication with one or more separable components of the nozzle assembly 110. The actuator 140 provides a separation force against the nozzle 112, and/or the nozzle extension 114, and/or the connector 138, 139. As such, the actuator 140 may cause the nozzle extension 114 to jettison from the nozzle 112 when the second stage rocket engine 108 is to enter atmospheric thrust mode.

The actuator 140 as shown in FIG. 3A may include a pyrotechnic device such as a separation nut. For instance, the connector 138 may be held together via one or more separation bolts/nuts, and the actuator 140 may be a pyrotechnic device that causes the connector 138 to separate, thereby allowing the nozzle extension 114 to separate from the nozzle 112. The connector 138 may be a clamp that is released due to the operation of the actuator 140. In some examples, the actuator 140 may include pyrotechnics, pneumatics, hydraulics (e.g., a hydraulic actuator), electromechanical components (e.g., an electromechanical actuator), an actuated pin puller, actuation with electricity or gas, other suitable mechanisms, or combinations thereof. Actuators such as electrical motors or pneumatic actuators may be provided to separate the nozzle extension 114 from the nozzle 112. For example, the actuator 140 may be a pneumatic actuator (e.g., solenoid actuator) that is configured to release the first connector 138. In some examples, the actuator 140 may relieve pressure that secures the V-band clamp to either side of the flanges 126, 130. As such, the actuator 140 may decouple the nozzle 112 from the nozzle extension 114. In some examples, the actuator 140 may translate a release mechanism on the V-band clamp that pushes open a lock on the V-band clamp, thereby releasing the portions of the V-band clamp that are annularly disposed about either side of the flanges 126, 130 of the nozzle assembly 110.

Figure 4A:
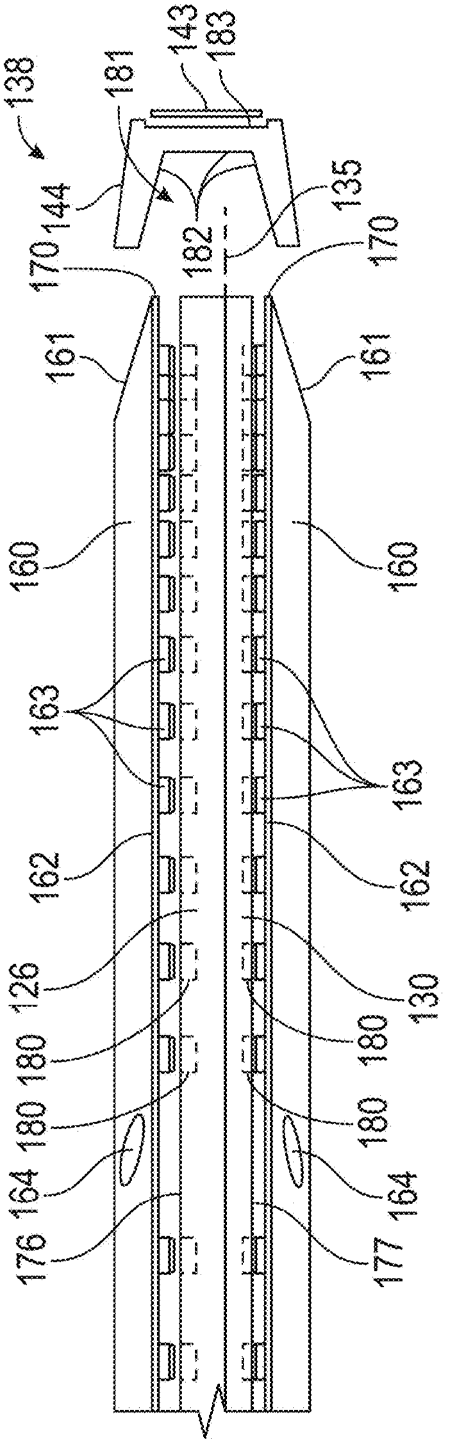
FIGS. 4A and 4B are respectively a partial exploded view and an assembled view of an example of an interface of the flanges of the nozzle and the nozzle extension having two wedge rings and that may be used with the second stage rockets of FIGS. 1, 2A, and 2B.
Figure 4B:
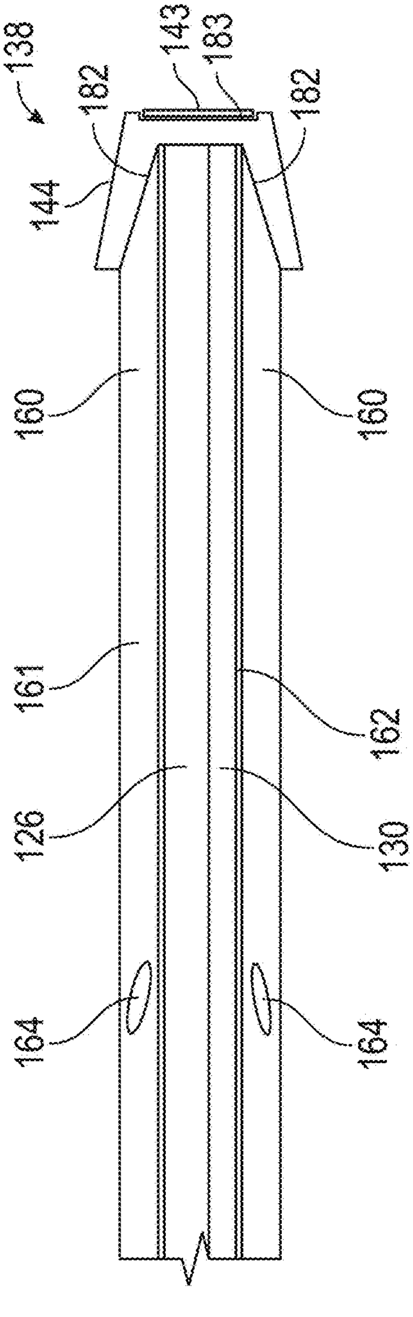
Figure 4C:
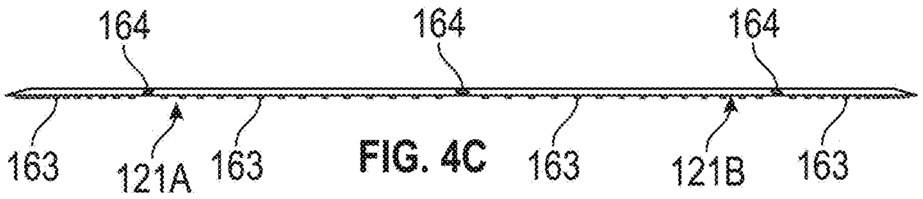
FIGS. 4C and 4D are respectively a side view and a bottom view of the wedge ring of the interface of FIGS. 4A and 4B.
Figure 4D:
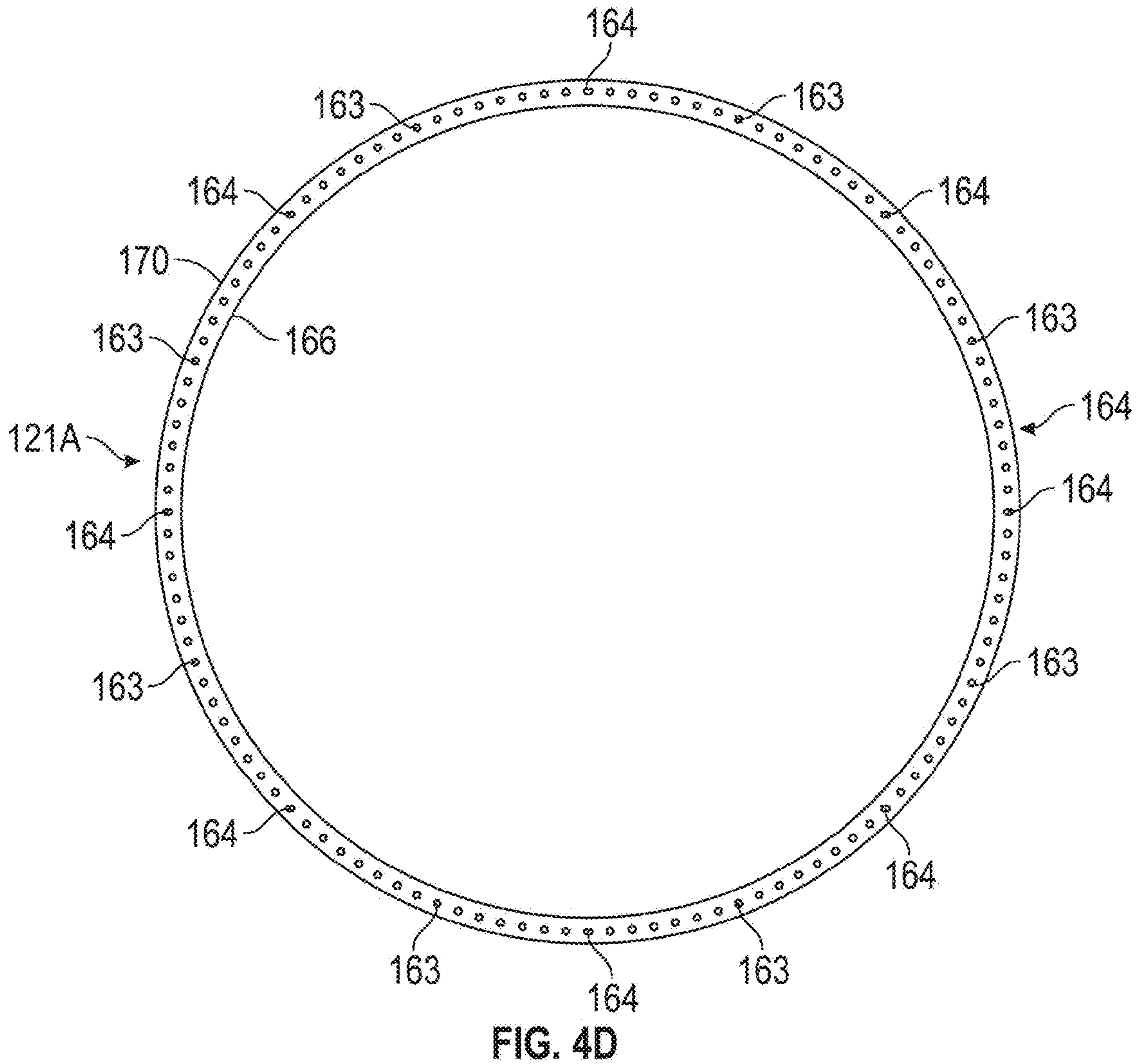

FIGS. 4A-4D illustrate one or more components of a nozzle assembly 110. In some examples, as shown in FIGS. 4A and 4B, the nozzle assembly 110 may include a nozzle flange 126, an extension flange 130, a connector 138 and a plurality of wedge rings 160. FIG. 4A is a partial exploded side view of the nozzle assembly 110 in an unassembled state and FIG. 4B is a side view of the nozzle assembly 110 in an assembled state. FIGS. 4C and 4D are side and bottom views, respectively, of the wedge ring 160 shown in isolation.

The nozzle assembly 110 can include two of the wedge rings 160. Each wedge ring 160 is a circular member that extends annularly in a ring-like shape (see, e.g., the bottom view of the wedge ring 160 in FIG. 4D). One of the wedge rings 160 can be secured on the top of the nozzle flange 126 and the other wedge ring 160 can be secured on the bottom of the extension flange 130. Accordingly, the nozzle flange 126 and the extension flange 130 can be positioned between the two wedge rings 160. For example, the nozzle flange 126 and/or the extension flange 130 can be sandwiched between the two wedge rings 160. The wedge rings 160 can be secured in place onto the respective flanges 126, 130 by the connector 138 to thereby sandwich and hold the flanges 126, 130 together along an interface 135 in the assembled state. The interface 135 may correspond to the inboard interface 131 of FIG. 3A.

As shown in FIGS. 4A-4D, the wedge rings 160 may have a wedge-shaped cross-sectional shape. The wedge-shaped body may include a thick radially inner end and a thinner radially outer end. The wedge-shaped body may taper from the thick end to the thin end. The wedge rings 160 may each include a sloped surface 161, a securing surface 162, and a cylindrical inner wall 166 (see FIG. 4D). The sloped surface 161, the securing surface 162, and the cylindrical inner wall 166 may form three sides of the cross-section of the wedge ring 160. In some examples, a cross-section of the wedge rings 160 can be a triangle. For example, the securing surface 162 may define a first side of the wedge rings 160, the cylindrical inner wall 166 may define a second side of the wedge rings 160, and the sloped surface 161 may define a third side of the wedge rings 160. In some examples, the securing surface 162 may be a planar surface extending radially outward from the cylindrical inner wall 166 to a radially outer edge 170 along a first plane. The cylindrical inner wall 166 can extend orthogonally from the securing surface 162 to the sloped surface 161. The sloped surface 161 may extend between the radially outer edge 170 to the cylindrical inner wall 166.

In some examples, the wedge rings 160 may also include one or more holes 164. The one or more holes 164 may extend through the wedge rings 160 from the sloped surface 161 to the securing surface 162. In some examples, the holes 164 may be equally spaced along the annular length of the wedge rings 160. For example, as shown in FIG. 4D, a plurality of the holes 164 may be positioned along the annular length of the wedge rings 160. In some examples, the one or more holes 164 can be a bolt hole. In some examples, the nozzle flange 126 and the extension flange 130 can also include one or more bolt holes. Accordingly, a bolt may be configured to pass through the nozzle flange 126, the extension flange 130, and the wedge rings 160 in an assembled state when the bolt holes of the respective parts are axially aligned.

The securing surface 162 can further include a plurality of protrusions 163 (for clarity, only some of the protrusions 163 are labelled in FIG. 4A). The plurality of protrusions 163 may extend orthogonally from a respective securing surface 162 toward the flanges 126, 130. The plurality of protrusions 163 may be radially positioned between the inner wall 166 and outer edge 170 of the wedge ring 160. In some examples, the plurality of protrusions 163 may be positioned along the annular length of the wedge rings 160. For example, as shown in FIG. 4D, the plurality of protrusions 163 can include 112 protrusions equally spaced along the annular length of the wedge rings 160. In some examples, a subset of the plurality of protrusions 163 may be positioned between two of the one or more holes 164. For example, as shown in FIG. 4D, fourteen of the plurality of protrusions 163 (for clarity, only some of the protrusions 163 are labelled in the figure) may be positioned between two holes 164 positioned at either end of the fourteen protrusions 163. In some examples, the plurality of protrusions 163 may be equally spaced from their respective adjacent protrusions 163 and/or hole 164 along the annular length of the wedge rings 160. For example, the plurality of protrusions 163 and the one or more holes 164 may be uniformly spaced along the annular length of the wedge rings 160 such that a common gap size extends between each of the plurality of protrusions 163 and their respective adjacent protrusions 163 and/or hole 164.

As shown in the bottom view of the wedge ring 160 of FIG. 4D, the wedge rings 160 can be formed from one or more portions or segments 121A and 121B. For example, the wedge rings 160 may include the two separable segments 121A, 121B forming equal halves of the body of the wedge rings 160. In some examples, the wedge rings 160 may be assembled with the one or more segments 121A, 121B placed around the nozzle and extension interface. The segments 121A, 121B may be welded together. In some examples, the connector 138 may be configured to clamp the segments 121A, 121B together.

The nozzle flange 126 and the extension flange 130 may have the same features as the nozzle flange 126 and extension flange 130 described above. As shown in FIG. 4A, in some examples, the nozzle flange 126 may further include an engagement surface 176. In some examples, the extension flange 130 may further include an engagement surface 177. The engagement surfaces 176, 177 may be configured to engage (e.g., contact) with the securement surface 162 of the respective wedge rings 160. For example, the engagement surfaces 176, 177 may each further include one or more recesses 180, for example openings or blind holes in the surfaces, each configured to receive a corresponding one of the plurality of protrusions 163. The recesses 180 within the respective flanges are shown in dashed line and for clarity only some of the recesses 180 are labelled in FIG. 4A.

In the assembled state, as shown in FIG. 4B, the nozzle flange 126 can abut the extension flange 130. The respective wedge rings 160 can be positioned on the abutting nozzle flange 126 and extension flange 130. The securing surface 162 of each of the wedge rings 160 can contact respective opposing surfaces of the nozzle flange 126 and the extension flange 130. The protrusions 163 of the wedge rings 160 may operatively couple with the corresponding recesses 180 in the engagement surfaces 176, 177 of the nozzle flange 126 and extension flange 130, respectively. The engagement of the protrusions 163 with the recesses 180 of the engagement surfaces 176, 177 of the nozzle flange 126 and the extension flange 130 may prevent lateral movement between the two flanges 126, 130.

The connector 138 can be a mechanism configured for securing the wedge rings 160 to the nozzle flange 126 and/or the extension flange 130. For example, as further shown in FIG. 4B, the connector 138 can retain the nozzle flange 126 and the extension flange 130 between the two wedge rings 160 by providing a clamping force onto the wedge rings 160. The connector 138 may be positioned around at least a portion of the wedge rings 160 to secure the nozzle assembly 110 together and prevent the wedge rings 160 from axially separating from the nozzle flange 126 and/or extension flange 130.

Figures 4E, 4F:
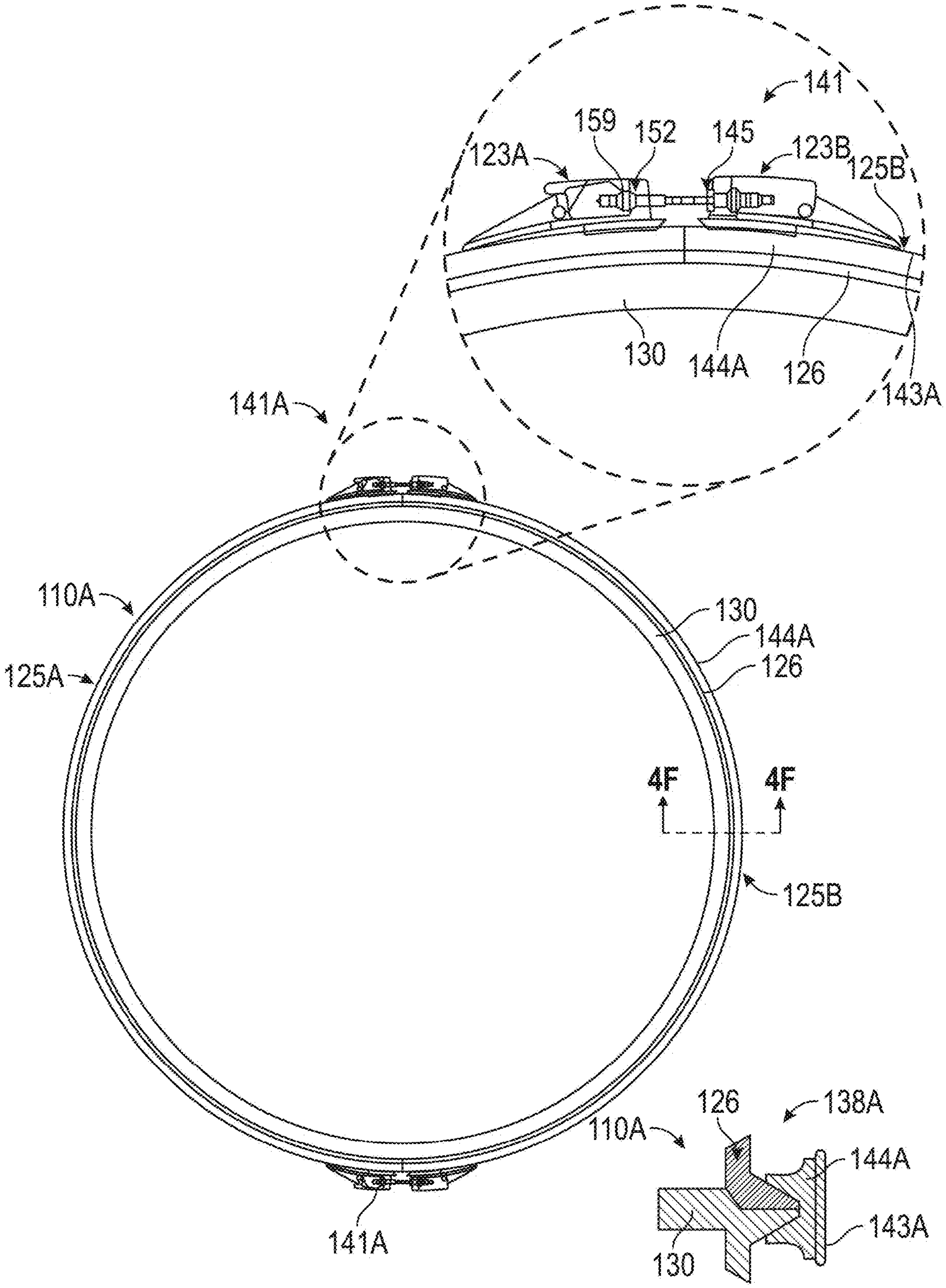
FIGS. 4E and 4F are a top view (with detail) and cross-sectional view respectively of an example of a clamp, having a release mechanism using explosive bolts, and that may be used with the interface of FIGS. 4A and 4B.
Figure 4G:
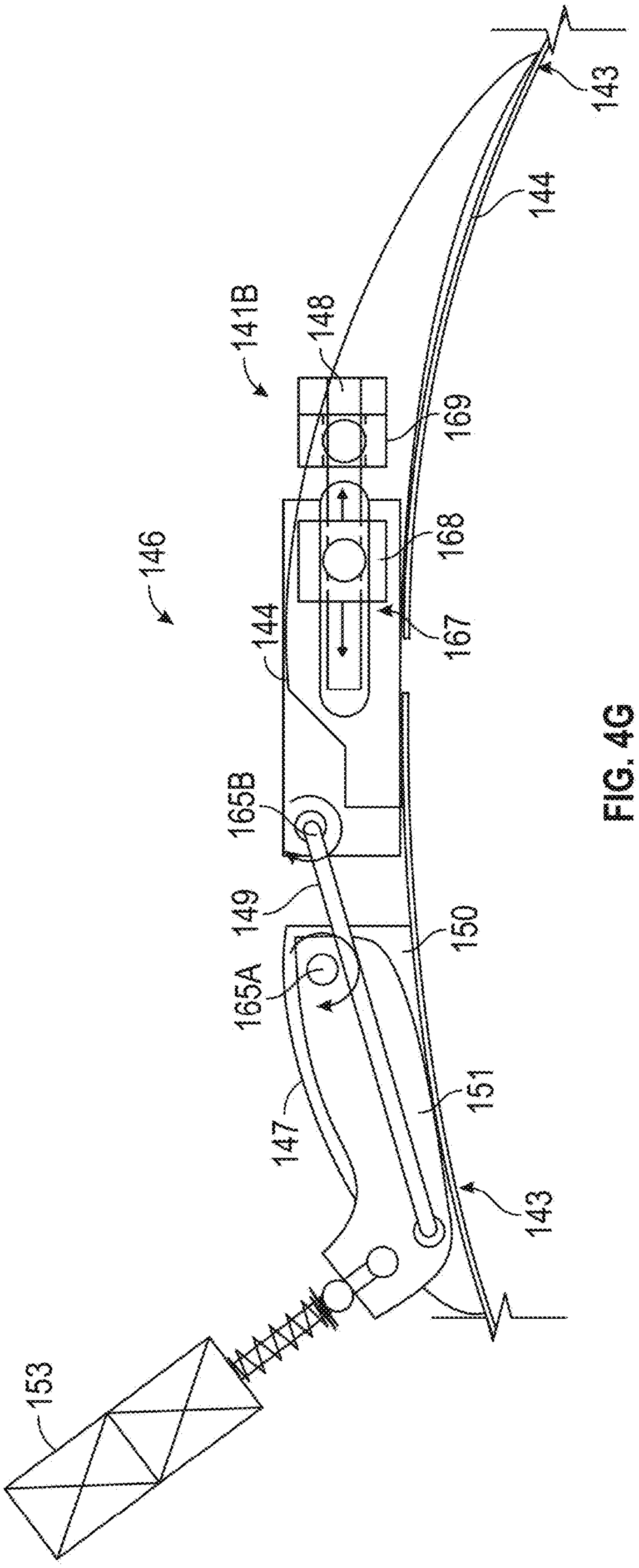
FIGS. 4G and 4H are respectively a partial top view and a partial side view of another example of a clamp, having a release mechanism using a clasp, and that may be used with the interface of FIGS. 4A and 4B.
Figure 4H:
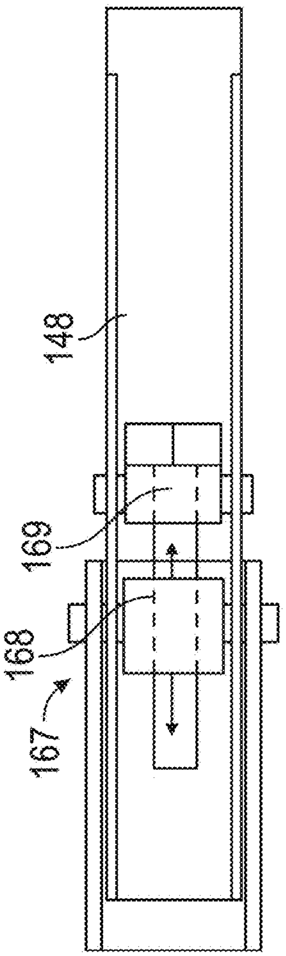
Figure 4I:
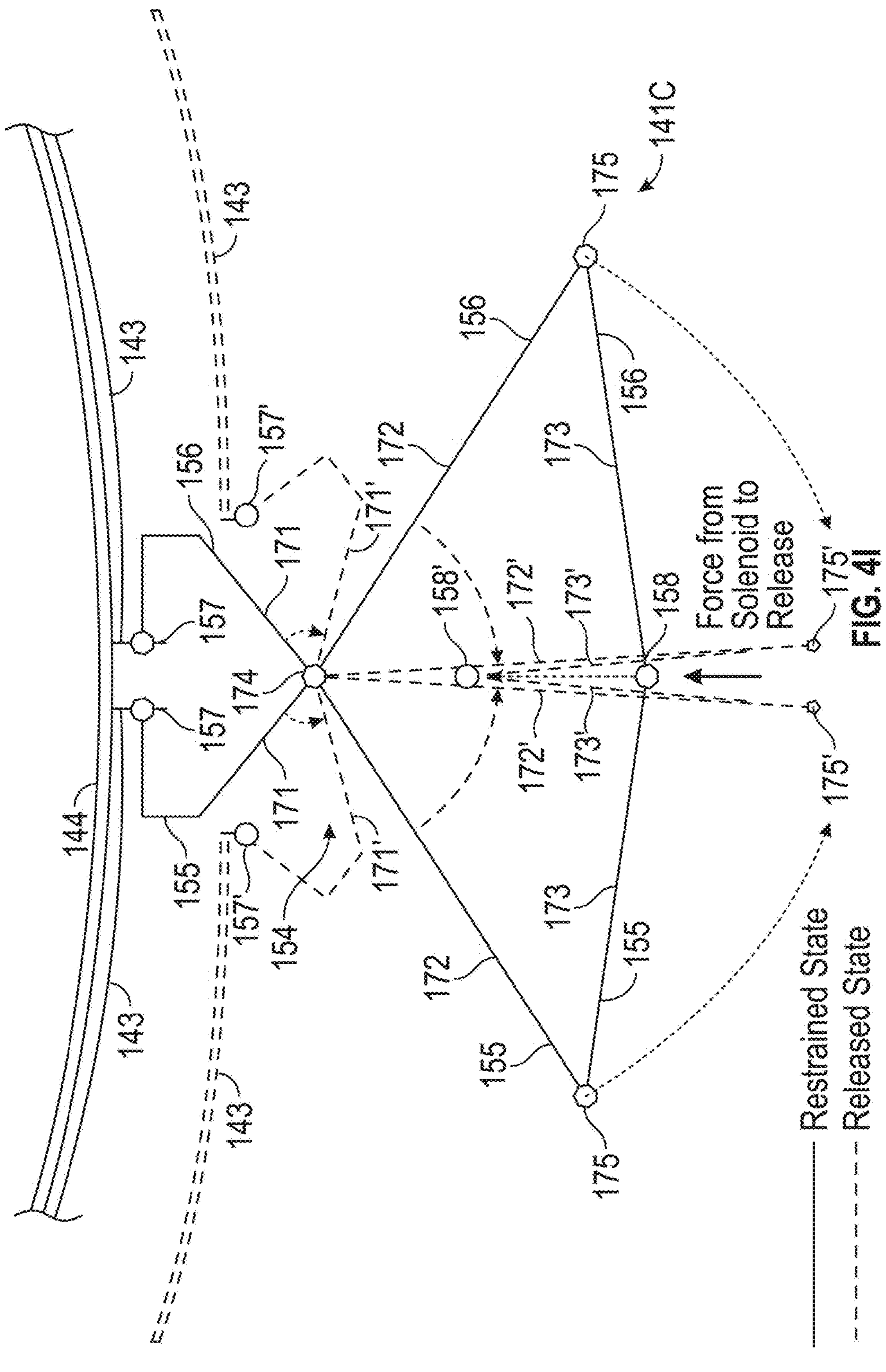
FIG. 4I is a partial top view of another example of a clamp, having a release mechanism using bow opening pliers, and that may be used with the interface of FIGS. 4A and 4B.

The connector 138 may be one or more of a plurality of different mechanisms. For example, the connector 138 may include a Marman clamp mechanism, an explosive bolt, a bolt cutter (e.g., a hydraulic bolt cutter), a clasp, and/or reverse pliers, as described in greater detail below. FIGS. 4A and 4B illustrate an example of the connector 138 in the form of a Marman clamp mechanism. FIGS. 4E and 4F illustrate an example of the connector 138 in the form of an explosive bolt. FIGS. 4G and 4H illustrate an example of the connector 138 in the form of a clasp. FIG. 4I illustrates an example of the connector 138 in the form of reverse pliers. As shown in FIGS. 4A and 4B, the connector 138 can include a strap 143 with a clamp body 144. In some examples, the connector 138 may be a Marman clamp mechanism.

The clamp body 144 can be configured to fit around the outer sides or perimeter of the nozzle assembly 110 and secure the nozzle assembly 110 together. In some examples, the clamp body 144 can have an interior groove 181 configured to receive a portion of the wedge rings 160 therein. In some examples, the clamp body 144 may be a semi-circular body with the interior groove 181. In some examples, the clamp body 144 may be a Marman clamp shoe. The interior groove 181 can include one or more mating surfaces 182 configured to abut the nozzle assembly 110. In some examples, a profile of the interior groove 181 can correspond to the profile of the nozzle assembly 110. For example, the interior groove 181 can be a substantially arched, C-shaped, or V-shaped cross-section, or other open profile. In such examples, the interior surface(s) of the interior groove 181 can abut the sloped surfaces 161 of the respective wedge rings 160 as shown in FIG. 4B. Accordingly, the clamp body 144 can retain the nozzle flange 126 and the extension flange 130 between the two wedge rings 160 by providing an axial inward clamping force via the interior groove 181. The clamp body 144 can extend around the entire perimeter of the nozzle assembly, or partially around the perimeter and with one or more clamp bodies 144.

As further shown in FIG. 4B, the strap 143 can be configured to secure the clamp body 144 to the nozzle assembly 110. The strap 143 may extend around the perimeter of the clamp body 144 to secure the clamp body 144 to the nozzle assembly 110. In some examples, the strap 143 can extend around a radially outer surface 183 of the clamp body 144. The strap 143 can provide a radially inward force to secure the clamp body 144 to the nozzle assembly 110.

The strap 143 may have a rectangular cross-sectional shape, like a belt. In some examples, the strap 143 can extend along a circular path around the nozzle assembly 110. The strap 143 can extend along a path with a radius greater than the outer radius of the nozzle assembly 110. In some examples, the strap 143 can extend along a path having a radius corresponding to the outer dimension of the clamp body 144. The strap 143 can extend around the entire perimeter of the nozzle assembly 110, or partially around the perimeter.

In some examples, the strap 143 may extend from a first end to a second end. The two ends may be positioned adjacently and/or configured to abut each other forming a circular or other closed shape. In some examples, the strap 143 may be a Marman clamp strap.

The strap 143 may have its two ends releasably connected together. In some examples, a mechanism may be used to releasably secure the two ends of the strap 143 together, such as an actuator having an explosive bolt as described with respect to FIGS. 4E and 4F, a bolt cutter, a clasp as described with respect to FIGS. 4G-4H, or reverse pliers as described with respect to FIG. 4I. FIGS. 4E and 4F illustrate an example of an actuator 141A including an explosive bolt 145 releasably securing a nozzle assembly 110A in an assembled state. FIG. 4E illustrates a top view of the nozzle assembly 110A having two actuators 141A that each use an explosive bolt 145.

The nozzle assembly 110A includes a nozzle flange 126 and an extension flange 130 releasably secured together by the two actuators 141A. FIG. 4F illustrates a cross-section view of the nozzle assembly 110A, as taken along line 4F-4F of FIG. 4E, showing the nozzle flange 126 secured with the extension flange 130 by a connector 138A that includes a split clamp body 144A and a split strap 143A. "Split" means there are multiple pieces that form the entire component, such as the strap described above having two ends, and as further described.

As shown in FIG. 4E, the split clamp body 144A can include a first segment 125A and a second segment 125B. The first segment 125A and the second segment 125B may each have a semi-circular shape and extent. Similarly, the split strap 143A may include two segments each extending about half the circumference of the nozzle assembly 110A. When the first and second segments 125A, 125B of the split clamp body 144A are released, the split clamp body 144A is thereby released and can allow for separation of the extension flange 130 from the nozzle flange 126. For example, after the connectors 138A release the split strap 143A, the first segment 125A can separate from the second segment 125B, thereby allowing the extension flange 130 and the nozzle flange 126 to separate from each other. In some examples, there may be a single clamp body 144A or more than two segments of the split clamp body 144A. Similarly, there may be a single strap 143A, or more than two segments of the split strap 143A.

The actuators 141A can releasably secure adjacent ends of the split strap 143A, for example adjacent ends of the two segments of the split strap 143A as shown. As shown in the detail view of FIG. 4E, the actuators 141A can each include a first portion 123A, a second portion 123B, and an explosive bolt 145 extending therebetween. The first portion 123A of the actuator 141A can be a mount. The second portion 123B of the actuator 141A can be a mount. The first portion 123A can further include a cavity for receiving a first end of the explosive bolt 145, a spherical washer 152, and a nut 159. The second portion 123B can further include a cavity for receiving a second opposite end of the explosive bolt 145. In some examples, the first portion 123A can be configured to secure to a first end of the split strap 143A, and the second portion 123B can be configured to secure to an opposing end of the split strap 143A. The explosive bolt 145 can thus releasably secure the first portion 123A and the second portion 123B of the actuator 141A. In some examples, the explosive bolt 145 may be coupled to the first portion 123A via the spherical washer 152 and the nut 159.

The explosive bolt 145 can include a longitudinal shaft. In some examples, the explosive bolt 145 can be an explosive fastener, stud, or other elongated structure. A pyrotechnic charge can be configured to fracture and break the shaft. The pyrotechnic charge may be remotely initiated. For example, an electric charge may be remotely controlled to activate the explosive bolt 145. The explosive bolt 145 may be configured to break into two or more parts after detonation. In some examples, the explosive bolt 145 can include a structurally weakened portion relative to other portions of the shaft. For example, the structurally weakened portion can include a thinner width relative to another portion of the explosive bolt. In some examples, the structurally weakened portion can be scored. For example, the weaker portion may be located where the explosive bolt 145 should fracture and split. The explosive fastener may incorporate an exploding bridge wire detonator, a slapper detonator, or a pulsed laser diode to activate the explosive bolt 145.

In some examples, in the assembled state, the split clamp body 144A extends annularly around the nozzle assembly 110A, the split strap 143A extends annularly around the split clamp body 144A, the first portions 123A of the two actuators 141A are secured to respective first ends of the split strap 143A, the second portions 123B of the two actuators 141A are secured to respective second ends of the split strap 143A, and the explosive bolts 145 each extend between the first portions 123A and the second portions 123B of the two actuators 141A. Accordingly, the explosive bolt 145 releasably couples the first segment 125A of the split clamp body 144A to the second segment 125B of the split clamp body 144A.

Actuating the explosive bolt 145 may cause the first portion 123A of each actuator 141A to separate from the corresponding second portion 123B of the actuator 141A, thus allowing opposing portions of the split strap 143A to separate. With the radial inward force of the split strap 143A removed, the split clamp body 144A can separate, thereby allowing the extension flange 130 to separate from the nozzle flange 126. The angled outer surfaces of the flanges 126, 130 (see FIG. 4F) facilitate and bias separation of the split clamp body 144A from the flanges 126, 130.

As shown in FIGS. 4E and 4F, the nozzle assembly 110A may not include the wedge rings 160 described above. As further shown, the nozzle flange 126 and the extension flange 130 may each have angled or sloped outer surfaces that contact the split clamp body 144A. Thus, the split clamp body 144A may directly contact the angled outer surfaces of the nozzle flange 126 and the extension flange 130. In some examples, the nozzle assembly 110A may include one or both wedge rings 160. In some examples, the explosive bolt 145 described with respect to the actuators 141A of FIGS. 4E and 4F may be replaced with a non-explosive bolt and bolt cutter. The nozzle assembly 110A described above may be used with the connector 138A as described above. However, the actuator 141 may use a non-explosive bolt, such as a fastener or stud nut. The non-explosive bolt may be released by a bolt cutter that is disposed about the bolt. The bolt cutter may be an automatic bolt cutter having a cutting portion adjacent the bolt. For example, the bolt cutter may include bladed jaws, that are disposed on either side of a bolt, such that the bolt cutter may be actuated to close about and cut the bolt so that the bolt does not secure the connector 138A in a closed position. Actuating the bolt cutter to break the non-explosive fastener into two or more parts may similarly release the nozzle assembly 110A as described above. FIGS. 4G and 4H illustrate an example of an actuator 141B including a clasp system 146 for releasably securing a nozzle assembly 110A together in an assembled state. FIG. 4G illustrates a side view of the clasp system 146. FIG. 4H illustrates a top view of the clasp system 146. The actuator 141B may be used on any of the nozzle assemblies described herein. The nozzle assembly 110A may be the same or similar as described above.

As shown in FIGS. 4G and 4H, the actuator 141B may have a clasp system 146. The clasp system 146 may be configured as a snap latch system. The clasp system 146 may include a dynamic element 147, a static element 148, a rod 149, and the strap 143. The strap 143 may have the same or similar features as described above. Therefore, the strap 143 may be a semi-flexible band extending from a first end to a second end configured to wrap around an exterior surface of the nozzle assembly 110, etc.

The dynamic element 147 can be a portion of the clasp system 146 configured to be actuated for transitioning the clasp system 146 between a secured position and an unsecured position. In some examples, the clasp system 146 can maintain tension within the connector 138A in the secured position and the clasp system 146 may not maintain tension within the connector 138A in the unsecured position. The dynamic element 147 can further include a base member 150 and a rotational member 151. The base member 150 may include a contoured, e.g., rounded, inner surface that conforms to the outer contour of the strap 143. The base member 150 may include a pivot point 165A. In some examples, the pivot point 165A may include a pin extending transversely from the base member 150.

The rotational member 151 may be movable between a first position and a second position. In some examples, the first position may correspond to the secured position and the second position may correspond to the unsecured position. The rotational member 151 can be secured to the base member 150 via the pivot point 165A such as with a pin or hinge. Accordingly, the rotational member 151 may rotate about the pivot point 165A to transition between the first position and the second position.

The dynamic element 147 may further include a latch actuator 153. The latch actuator 153 may be configured to move linearly. For example, as shown in FIG. 4G, the latch actuator 153 may extend from an end of the rotational member 151 opposite the pivot point 165A. Accordingly, the latch actuator 153 can move linearly toward and away from the rotational member 151 to cause rotation of the rotational member 151 about the pivot point 165A between the first position and the second position.

The static element 148 can be a stationary member securing the actuator 141B to the nozzle assembly 110. The static element 148 can be a straight inner surface as shown, or a contoured inner surface conforming to the sidewall of another end of the strap 143 (or to another segment of the strap 143, in the case of a split strap 143). In some examples, the contoured surface may be rounded. The static element 148 may further include a pivot point 165B, such as a pin, extending transversely from the static element 148. The static element 148 can include an actuation mechanism 167. As shown, the actuation mechanism 167 can include a sliding latch 168 and a securing element 169. The sliding latch 168 may be linearly movable within a slot defined by the static element 148. The securing element 169 may be a magnet. In some examples, the actuation mechanism 167 may be a solenoid, spring, or an electric motor.

The rod 149 can be a substantially rigid member. The rod 149 can couple the dynamic element 147 with the static element 148. The rod 149 can provide a force to pull the dynamic element 147 and the static element 148 together. In some examples, the rod 149 can be configured to move the dynamic element 147 relative to the static element 148. A first end of the rod 149 may be rotatably coupled to the dynamic element 147 and a second opposite end of the static element 148 can be rotatably connected to the static element 148. In some examples, the rod 149 can rotatably couple with the pivot point 165B. Accordingly, in some examples, the rod 149 may rotate when the latch actuator 153 is actuated. The rod 149 can rotate with a portion of the dynamic element 147 relative to the static element 148 about respective pivot points 165A, 165B. In some examples, the latch actuator 153 may be coupled to the dynamic element 147 such that the latch actuator 153 can actuate (e.g., release spring tension, provide air pressure, etc.) to initiate rotation of the rotational member 151 and the rod 149 in a radially outward direction away from the strap 143. As such, the latch actuator 153 may cause release of the strap 143, to allow the extension flange 130 to separate from the nozzle flange 126, as described.

Respective ends of the strap 143 may be coupled to the dynamic element 147 and the static element 148. The actuator 141B may transition between a secured position and an unsecured position. In some examples, the secured position may correspond to a state wherein the actuator 141B maintains tension of the strap 143 about the nozzle assembly 110, such as the configuration shown in FIG. 4G. In some examples, the unsecured position may correspond to a state wherein the actuator 141B does not maintain tension of the strap 143 about the nozzle assembly 110, such as after rotation of the mechanism as described.

In the secured position, as shown in FIGS. 4G and 4H, the rotational member 151 may be aligned with the base member 150 such that a longitudinal axis of the rotational member 151 extends along a longitudinal axis of the base member 150. In such examples, the rotational member 151 may abut the strap 143. In the unsecured position, the rotational member 151 may be angularly displaced from the base member 150. For example, the longitudinal axis of the rotational member 151 may be angularly displaced from the strap 143 at an angle of ten or more, 20 or more, or 30 or more, degrees. Angularly displacing the rotational member 151 from the base member 150 can reduce the tension in the strap 143, thereby enabling the nozzle assembly 110 to release, as described.

In some examples, the second stage rocket 102 can be operated by operating the second stage rocket engine 108 in a vacuum thrust mode, wherein the second stage rocket engine 108 comprises at least one nozzle assembly 110 having a nozzle extension 114 releasably attached to a nozzle 112 along an interface 135. The second stage rocket 102 can be further operated by operating a clasp system 146 to release a connector 138A extending annularly about the interface 135. The second stage rocket 102 can be further operated by releasing the nozzle extension 114 from the nozzle 112 and operating the second stage rocket engine 108 in an atmospheric thrust mode using the nozzle 112 without the nozzle extension 114. In some examples, operating the clasp system 146 can include rotating the dynamic element 147 to release the connector 138A from the interface 135. In some examples, rotating the dynamic element 147 to release the connector 138A from the interface 135 can include transitioning the dynamic element 147 from a secured position to an unsecured position. In some examples, operating the clasp system 146 to release the connector 138A can include actuating the latch actuator 153 to transition the dynamic element 147 from the secured position to the unsecured position. In some examples, rotating the dynamic element 147 to release the connector 138A from the interface 135 can include rotating the rotational member 151 away from the static element 148 to transition the dynamic element 147 to the secured position and/or rotating the rotational member 151 toward the static element 148 to transition the dynamic element 147 to the unsecured position. Accordingly, the second stage rocket can include a nozzle assembly configured to transform from a vacuum-optimized configuration to an atmospheric-optimized configuration.

FIG. 4I is a top view of a schematic of another example of an actuator 141C for releasably securing the nozzle assembly 110. The actuator 141C may be used with any of the nozzle assemblies described herein. The actuator 141C may be configured to releasably secure the strap 143. The strap 143 may be secured about the clamp body 144, as described. In some examples, the actuator 141C can include a reverse pliers mechanism 154 that couples to ends of the strap 143 (or to ends of segments of the strap 143, as in a split strap, as described). The reverse pliers mechanism 154 may be used to secure and release the strap 143 from around the clamp body 144 for separation of the nozzle flange 126 from the extension flange 130, as described. In FIG. 4I, the reverse pliers mechanism 154 and strap 143 are shown in a secured configuration (represented by the solid lines) and an unsecured configuration (shown by the dashed lines).

The reverse pliers mechanism 154 can include a first extension 155 and a second extension 156 which may be substantially rigid, elongated bodies. Each of the first extension 155 and the second extension 156 can form a half of the reverse pliers mechanism 154. The first and second extensions 155, 156 rotate to move the mechanism between a secured and unsecured configuration. The reverse pliers mechanism 154 includes, as shown in their positions when the mechanism is in a secured configuration, first ends 157, one or more second ends 158, a first portion 171, a second portion 172, a third portion 173, a first hinge point 174, and one or more second hinge points 175. The corresponding unsecured positions of these features are designated as the first end 157', the second end 158', the first portion 171', the second portion 172', the third portion 173', the first hinge point 174, and the second hinge point 175'. Thus, the first hinge point 174 may not move between the secured and unsecured configurations. The first hinge point 174 may be a hard point to support the mechanism.

The strap 143 may have the same features as described above, such as a semi-flexible band extending from a first end to a second end, etc. In the secured configuration, the first ends 157 may be attached to the opposing ends of the strap 143. The first ends 157 may locate the ends of the strap 143 relatively closer together such that the strap 143 is tensioned around the exterior surface of the clamp body 144. In the unsecured configuration, the first ends 157' are located relatively farther apart, such that the strap 143 is not tensioned around the nozzle assembly 110 and allows the clamp body 144 to release. In some examples, the first extension 155 and the second extension 156 can apply opposing tangential forces respectively to a first end of the connector 138A and a second opposing end of the connector 138A. For example, the first extension 155 can apply a first tangential force to the first end of the connector 138A (e.g., the first end of the strap 143) and the second extension 156 can apply a second tangential force opposite the first tangential force to the second end of the connector 138A (e.g., the second end of the strap 143). The "tangential" force may refer to a force in a direction, or a force having a component in a direction, along a circumference of the interface or a direction that is tangent to such circumference.

The first ends 157 may define an engagement end of each of the first extension 155 and the second extension 156 for engaging the strap 143 (or in some examples engaging the clamp body 144). The first ends 157 may be configured to transition between a first position and a second position to translate the ends of the strap 143 between the secured and unsecured configurations. The first ends 157 can transition between the first position and the second position by rotating about the hinge point 174 via rotation of the first portions 171. The first ends 157 may rotate in opposite directions. For example, one of the first ends 157 may transition from its first position to its second position by rotating counter-clockwise about the hinge point 174 while the other of the first ends 157 may transition from its first position to its second position by rotating clockwise about the hinge point 174. In some examples, the first positions may correspond to the secured configuration and the second positions may correspond to the unsecured configuration.

The one or more second ends 158 may be at an opposite side of the actuator 141C relative to the first ends 157. The one or more second ends 158 may be configured to transition between a first position as shown by the location of the second end 158 to a second position as shown by the different, radially inward location of the second end 158'. Transitioning the one or more second ends 158 may act to operatively move the first ends 157 between their respective first and second positions via rotation of the first portions 171, second portions 172 and third portions 173 about the hinge point 174, as further described. In some examples, the second ends 158 may translate along a linear path. For example, as shown in FIG. 4I, the second ends 158 can translate radially between a radial outward position at the second end 158 and a radial inward position at the second end 158'. In some examples, the radial outward position may correspond to the first position and the radial inward position may correspond to the second position. Accordingly, translating the one or more second ends 158 radially inward may cause the first ends 157 to move farther apart from each other. The first position of the one or more second ends 158 may correspond to when the reverse pliers mechanism 154 is in the secured configuration, and the second position of the second ends 158' may correspond to when the reverse pliers mechanism 154 is in the unsecured configuration. In some examples, there may only be a single second end 158 that joins both of the third portions 173 together. The single second end 158 may operate as described above. Movement of the one or more second ends 158 can cause movement of the first ends 157 via rotation of one or more portions of the mechanism, as further described.

The first portions 171 can be rigid segments of fixed length. The first portions 171 can extend from proximal ends at the respective first ends 157 to distal ends at the first hinge point 174. The first portions 171 can be non-linear. For example, as shown in FIG. 4I, the first portions 171 may extend in a first circumferential direction from their proximal ends, and then extend radially outward and in a second opposite circumferential direction to the first hinge point 174. The first portions 171 may therefore have a bent or arced shape.

The second portions 172 can be rigid segments of fixed length. In some examples, the second portions 172 can extend (for example, linearly) between a proximal end at the hinge point 174 to a distal end at the second hinge point 175. The second portions 172 may extend radially outward in first circumferential directions to their respective second hinge points 175. In some examples, the angle between the first portion 171 and the adjacent second portion 172 may be fixed. This angle may be between 45 degrees and 90 degrees, between 65 degrees and 80 degrees, or between 70 degrees and 75 degrees. In some examples, the second portions 172 can be configured to rotate to cause the respective first portions 171 to rotate, as described. The second portions 172 may be rotated via the third portions 173 that connect to the second portions 172 at respective hinge points 175. In some examples, the second portions 172 may be able to flex slightly in response to actuation forces in order to move between the configurations.

The third portions 173 can be rigid segments of fixed length. In some examples, the third portions 173 can extend between a proximal end at the second hinge point 175 to a distal end at the respective second ends 158. The third portions 173 can extend in a second circumferential direction, that is opposite the first circumferential direction in which the corresponding second portions 172 extend. The third portions 173 can extend from their respective proximal ends at the respective second hinge points 175 to their respective distal ends at the one or more second ends 158. The third portions 173 are configured to transition, relative to the nozzle assembly 110, from a relatively more circumferential orientation in the secured state (e.g., in FIG. 4I, see positions of the second hinge points 175 and the second ends 158) to a relatively more radial orientation in the unsecured state (e.g., see positions of the second hinge points 175' and the second ends 158'). In some examples, the third portions 173 may be able to flex slightly in response to actuation forces in order to move between the configurations. In the secured state, as shown in FIG. 4I, the angle between the third portions 173 and the respective adjacent second portions 172 can be greater than 20 degrees, greater than 30 degrees, or between 30 degrees and 60 degrees. In the unsecured configuration, as shown in FIG. 4I, the angle between the third portions 173 and the corresponding second portions 172 can be less than 20 degrees. In some examples, the angle between the third portions 173 and the corresponding second portions 172 can be between 5 degrees and 15 degrees, in the unsecured configuration.

The first extension 155 and the second extension 156 may each include respective first, second, and third portions 171, 172, 173. The first extension 155 and the second extension 156 may be coupled together at their respective second ends 158 and at the first hinge point 174. The actuator 141C may be actuated via an application of a force to the second ends 158. In some examples, the second ends 158 may be configured to be linearly actuated by an applied force. In some examples, the linear actuation can be along a center line between the first extension 155 and the second extension 156. For example, the center line may be in a radial direction relative to the nozzle assembly 110. Transitioning the one or more second ends 158 from the first position to the second position may include moving the second ends 158 radially inward to a radially inward position located closer to the first hinge point 174 than a radially outward position as shown.

The first extension 155 and the second extension 156 may be configured to transition between the secured configuration and the unsecured configuration. As discussed above, in the secured configuration, the first ends 157 of the first extension 155 and the second extension 156 are in a closed configuration and act to secure the strap 143 and/or clamp body 144. In the unsecured configuration, the first ends 157 of the first extension 155 and the second extension 156 move away from each other and are in an open configuration to release the strap 143 and clamp body 144.

Changing the position of the second ends 158, 158' of the first extension 155 and the second extension 156 changes the configuration of the first extension 155 and the second extension 156 between the secured configuration and the unsecured configuration. In the secured configuration, the second ends 158 are in a first position (radially outward position) distal from the strap 143 and/or clamp body 144. In this configuration, the third portions 173 extend substantially laterally (e.g. circumferentially) from the second end 158. In the secured configuration, the third portions 173 act to prevent rotation of the second portions 172 thereby keeping the first ends 157 in a secured configuration. By comparison, in the unsecured configuration, the second ends 158' of the first extension 155 and the second extension 156 are in a second position (radially inward position) closer to the strap 143 and/or clamp body 144. In the second position, the third portions 173' extend in a substantially radial direction. In the unsecured configuration, the third portions 173' act to rotate the second portions 172' such that the second hinge points 175' are farther away from the strap 143 and clamp body 144, thereby further separating the first ends 157' via rotation about the first hinge point 174. Accordingly, the reverse pliers mechanism 154 can include moving the first ends 157' of the first extension 155 and the second extension 156 away from each other at least partially in a tangential direction.

Accordingly, the first extension 155 and the second extension 156 may be rotatably coupled to each other and configured to transition between the secured and unsecured configurations. In some examples, the first extension 155 and the second extension 156 may be rotatably coupled about the first hinge point 174 such that the respective first ends 157 of the first extension 155 and the second extension 156 advance toward each other when the respective second ends 158 are in a first position to achieve the secured configuration. Similarly, the respective first ends 157' of the first extension 155 and the second extension 156 may advance away from each other when the respective second ends 158' are in a second position to achieve the unsecured configuration. The first ends 157, 157' may be coupled to respective ends of the strap 143. The second ends 158, 158' may be held in place at least in part by a connector coupled to an actuator 141, such as a solenoid. The second ends 158, 158' may be actuated by a linear force actuator 141. In some examples, the linear force actuator 141 may be a linear solenoid. In some examples, the linear force actuator 141 may be positioned external of the nozzle 112. The actuator 141 may be activated to release the first extension 155 and the second extension 156 to rotate with respect to each other such that the first ends 157, 157' advance away from each other, which may allow the ends of the strap 143 to move away from each other releasing the Marman clamp mechanism.

Figure 5:
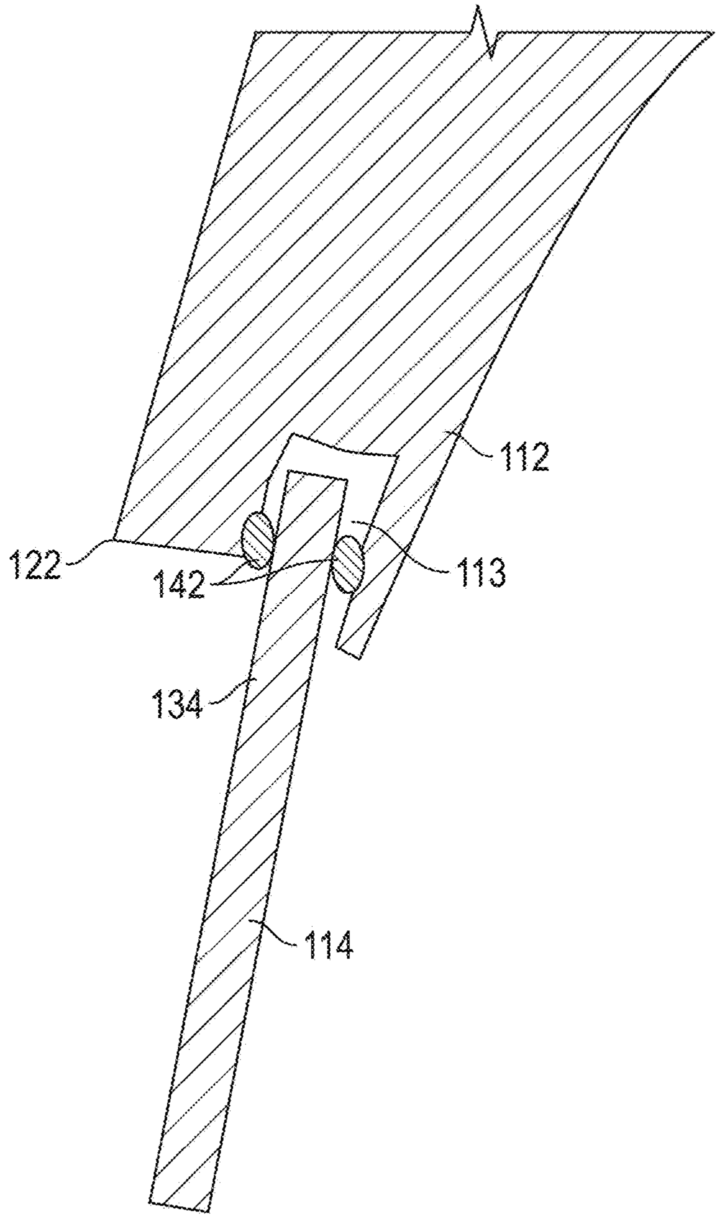
FIG. 5 is a detail partial cross-sectional side view of an example of an interface between a nozzle and a separable nozzle extension having a seal.

FIG. 5 is a cross-section view of a sample interface of the nozzle 112 and the nozzle extension 114. The outboard nozzle end 122 may interface with the inboard extension end 134. The outboard nozzle end 122 may define a groove 113 that extends annularly within and around the outboard nozzle end 122. The inboard extension end 134 may be received into the groove 113. The assembly shown may be used at the inboard interface 131 or the outboard interface 133, or in other examples of the nozzle assembly 110 having different interfaces.

There may be one or more seals 142 located at the interface. The seal 142 may extend annularly around the circumference of the interface. The seal 142 may be a deformable material that secures the nozzle 112 and nozzle extension 114 together while preventing loss of exhaust gas through the interface. As shown there may be two seals 142, with one of the seals located on a radially outward side of the nozzle extension 114 and the other of the seals located on a radially inward side of the nozzle extension 114.

Figure 6B:
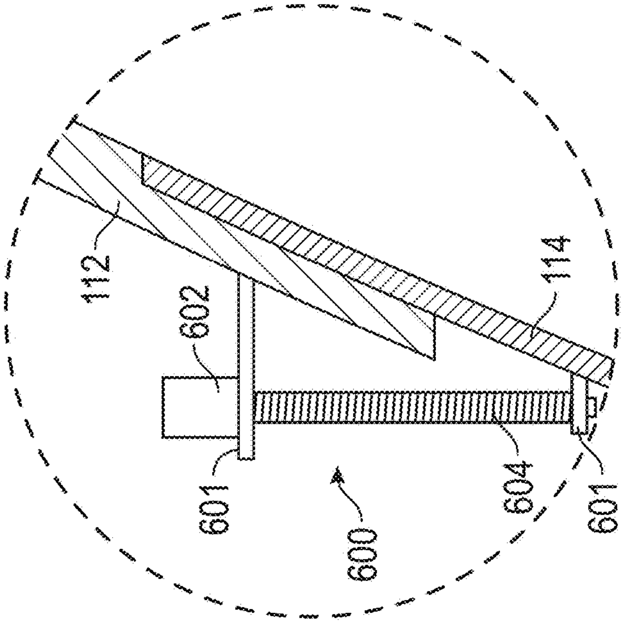
FIGS. 6A and 6B are respectively a cross-section side view of an example of a nozzle assembly with separable extension via a jackscrew jettison actuator, and a detail view of the interface of the nozzle and extension with the actuator.
Figure 6A:
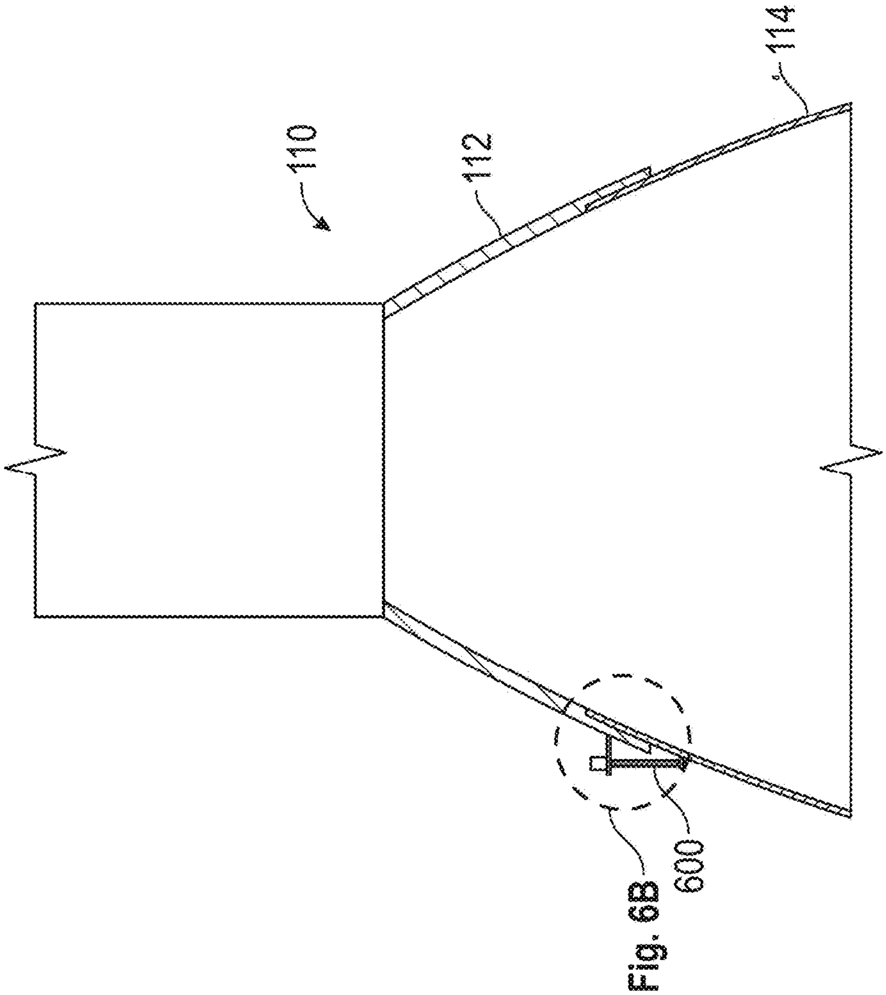

FIG. 6A is a side cross-sectional view of another example of the nozzle assembly 110 having an actuator 600, and FIG. 6B is a close-up detail view of the actuator 600. The actuator 600 is shown as a jackscrew assembly that may jettison the nozzle extension 114 from the nozzle 112. As shown in FIG. 6A, the nozzle 112 can extend from an inboard end to an outboard end along an axis. Similarly, the nozzle extension 114 can extend from an inboard end to an outboard end along the axis. One or more flanges 601 may extend radially outwardly from the nozzle 112 and the nozzle extension 114. For example, as shown in FIG. 6B, the outboard end of the nozzle 112 can include a first flange 601 extending annularly about, and protruding radially outward from, the outboard end of the nozzle 112. As further shown in FIG. 6B, the inboard end of the nozzle extension 114 can include a second flange 601 extending annularly about, and protruding radially outward from, the inboard end of the nozzle extension 114. The actuator 600 may include a threaded jackscrew 604 disposed through the flanges 601, such as through an opening which may be a cylindrical, threaded channel in the flanges 601. Accordingly, the jackscrew 604 may axially secure the nozzle 112 and nozzle extension 114 via attachment with the respective flanges 601. The jackscrew 604 can releasably couple the first flange 601 and the second flange 601 together. In some examples, the jackscrew 604 can be configured to rotate to release the nozzle extension 114 from the nozzle 112. For example, the actuator 600 may further include an electrical motor 602, which may rotate the jackscrew 604 to translate the jackscrew 604 axially up or down. The jackscrew 604 may translate upward to detach from the second flange 601, thereby releasing the nozzle extension 114. In some examples, the jackscrew 604 may translate downward to axially press downward against the nozzle extension 114 to separate and jettison the nozzle extension 114 by applying pressure to at least a portion of a surface of the nozzle extension 114. There may be multiple jackscrews 604 located at various circumferential locations along the interface.

Example Method of Jettisoning Nozzle Extension

In operation, at least one processor may be used to coordinate the functions of the first stage rocket 104 and/or the second stage rocket 102 during operation. The first stage rocket engine 106 may be activated to cause the rocket system 100 to expel propulsive exhaust gasses and complete an engine burn to propel the rocket system 100 to a desired altitude.

As described above, the second stage rocket engine 108 may be activated to propel the second stage rocket 102 during a launch mission and facilitate reentry and/or landing of the second stage rocket 102. For example, the second stage rocket engine 108 may provide thrust to cause the second stage rocket 102 to ascend in the earth's atmosphere to a desired distance. During the time that the second stage rocket 102 ascends in or away from the earth's atmosphere, the second stage rocket 102 may be operated in the vacuum thrust mode for optimized operation outside an atmosphere. The second stage rocket 102 may further be operated to facilitate controlled landing of the second stage rocket 102 within the atmosphere. During the time the second stage rocket 102 approaches landing, the second stage rocket 102 may be operated in the atmospheric thrust mode for operation inside an atmosphere such as the earth's atmosphere during landing.

Figure 7:
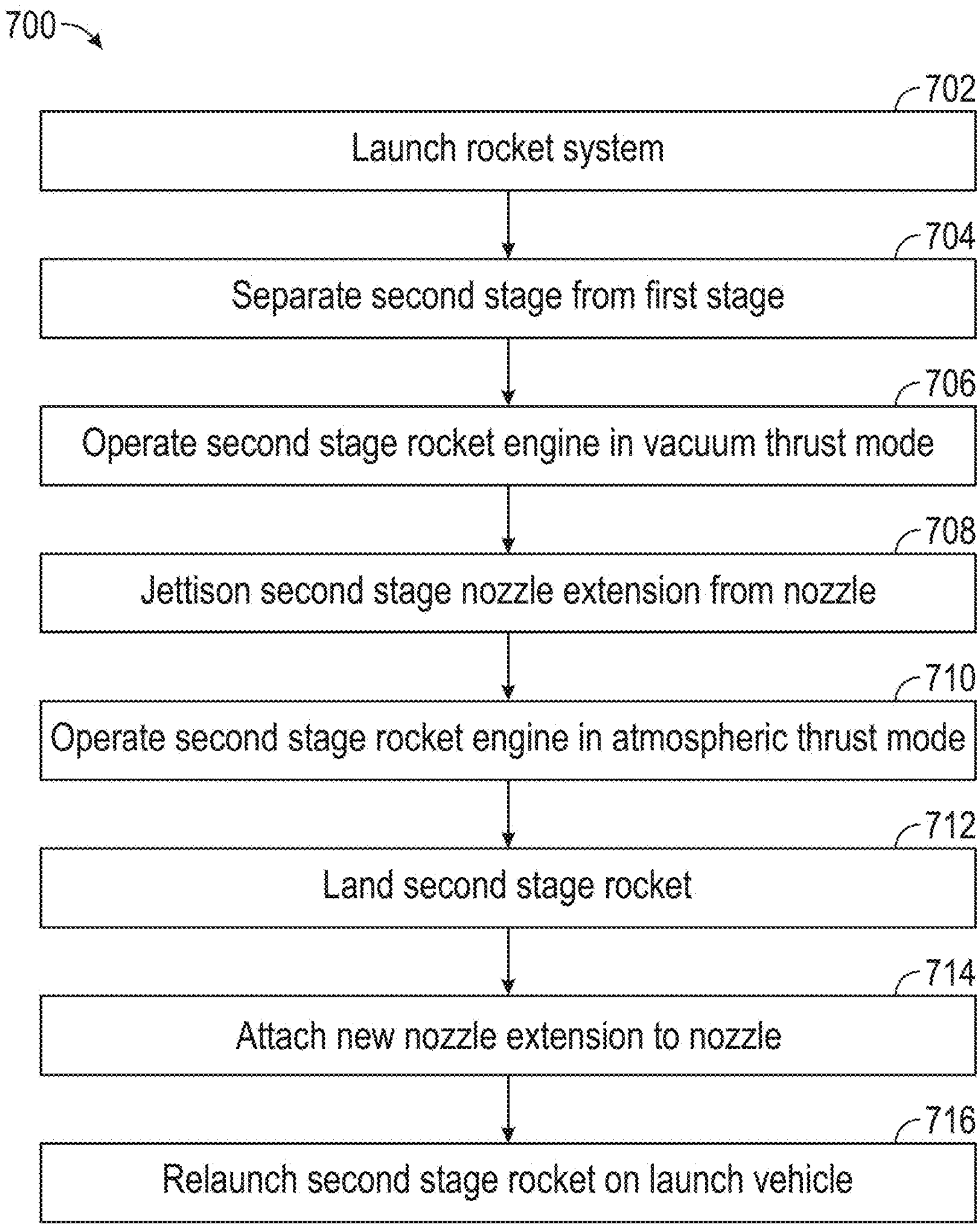
FIG. 7 is a flow chart showing an example of a process for launch and reuse of a launch vehicle having a second stage with separable and replaceable nozzle extension.

FIG. 7 is a flow diagram illustrating an example method 700 that may be used with the rocket system 100, for example for extraplanetary propulsion and reentry of the rocket system 100. Each of the following steps may be executed by one or more processors. At block 702, the rocket system 100 launches, for example via one or more processors. As described above, the rocket system 100 may be launched by initiating the first stage rocket engines 106 for an initial ascent launch.

The method 700 continues with step 704, where the second stage rocket 102 separates from the first stage rocket 104, for example via control signals from the one or more processors. The second stage rocket 102 may be jettisoned by releasing connectors coupling the second stage rocket 102 to the first stage rocket 104. For example, the first stage rocket 104 may release clamps, open portions of the first stage rocket 104 containing portions of the second stage rocket 102, and/or detonate explosives to separate portions of the second stage rocket 102 from the first stage rocket 104.

The method 700 then moves to step 706, where the second stage rocket engine 108 is operated in the vacuum thrust mode, for example via control signals from the one or more processors. When in the vacuum thrust mode, the second stage rocket engine 108 may operate while retaining the nozzle extension 114 attached to the nozzle 112. For example, the processor may specify fuel burn parameters optimized for producing thrust in a vacuum that cause the rocket engine to expand the exhaust plume to a desired diameter at the outboard extension end 136. As the processor operates the second stage rocket engine 108, the outlet diameter is the diameter of the outboard extension end 136 which provides nozzle dimensions to operate the second stage rocket 102 in the vacuum thrust mode. In some examples, the vacuum thrust mode is initiated based on a time from initiation of ascent and/or jettison. In other examples, the vacuum thrust mode is initiated based on a sensed distance traveled. In some examples, the vacuum thrust mode is initiated by a user interfacing with the processor.

The method 700 then moves to step 708, where the nozzle extension 114 is jettisoned from the nozzle 112. The one or more processors may provide control signals that cause the actuator 140 to detach the nozzle extension 114 from the nozzle 112. Any of the actuators and associated mechanisms, devices and methods described herein may be used to separate the nozzle extension, for example those shown in and described with respect to FIGS. 3A-4I. For example, the processor may initiate an electrical signal to activate the actuator 140 to release the connector 138. Alternatively or additionally, the processor may initiate an electrical signal sent to a detonator in the explosive charge that detonates the shaped charge of the actuator 141 against the connectors 139. As such, the actuator separates the nozzle extension 114 from the nozzle 112. In some examples, the nozzle extension 114 may be jettisoned in space during a mission, and in other examples, the nozzle extension 114 may be jettisoned in the atmosphere after a descent burn has begun, in further examples, the nozzle extension 114 may be jettisoned in space before the ascent burn has completed. In some examples, the actuator 140 is initiated based on a time from initiation of descent. In other examples, the actuator 140 is initiated based on a sensed altitude. In some examples, the actuator 140 is initiated by a user interfacing with the processor. In some examples, the actuator 140 is initiated based on a time from the start of ascent.

The method 700 then moves to step 710, where the second stage rocket 102 is operated in the atmospheric thrust mode, for example via one or more processors providing control signals. For example, the processor may determine fuel burn parameters that cause the second stage rocket engine 108 to expand the exhaust plume to a second, different exit diameter that is optimized for atmospheric operation. As the processor operates the second stage rocket engine 108, the outlet diameter is the second diameter of the nozzle 112 which provides the nozzle dimensions to operate the second stage rocket 102 in the atmospheric thrust mode. In some examples, the atmospheric thrust mode is initiated based on a time from initiation of descent. In other examples, the atmospheric thrust mode is initiated based on a sensed altitude such as a minimum altitude to land (e.g., from 5000 ft.-10,000 from land surface). In some examples, the atmospheric thrust mode is initiated by a user interfacing with the processor.

The method 700 then moves to step 712, where the second stage rocket 102 lands. The processor may provide control signals to cause the second stage rocket 102 to operate in a landing thrust mode. The landing thrust mode may include fuel burn parameters configured to manage momentum of the second stage rocket 102 as the second stage rocket 102 approaches a surface such as a planetary surface. In some examples, the landing thrust mode is initiated based on a time from initiation of descent. In other examples, the landing thrust mode is initiated based on a sensed altitude. In some examples, the landing thrust mode is initiated by a user interfacing with the processor.

The method 700 then moves to step 714, where a new nozzle extension is attached to the nozzle 112. The nozzle extension 114 may be replaced with a new one by a human operator on a landing surface such as the ground. In some examples, the intermediate nozzle extension 128 is removed and replaced. In some examples, the processor may initiate an electrical connection with the actuator to secure the new nozzle extension with the nozzle 112. The processor may initiate the electrical connection upon final assembly of the new nozzle extension with the nozzle assembly 110.

The method 700 then moves to step 716, where the second stage rocket is relaunched on the launch vehicle. The processor may cause the first stage rocket 104 to re-launch with the second stage rocket 102 coupled thereto. For example, the second stage rocket 102 may be attached to a nose portion of the first stage rocket 104 which is used for the initial launch such as a launch out of an atmosphere such as earth's atmosphere. In some examples, the first stage rocket 104 may be the same first stage rocket 104 used for at least one previous launch with the second stage rocket 102. In other examples, the first stage rocket 104 may be a different first stage rocket that has not been used in a previous launch with the second stage rocket 102. The first stage rocket 104 may further be operated as described above.

Embodiments and Terminology

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Various modifications to the implementations described in this disclosure will be readily apparent to those skilled in the art, and the generic principles defined herein may be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations, unless otherwise stated.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Additionally, other implementations are within the scope of the following claims. In some cases, the actions recited in the claims may be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A rocket nozzle assembly comprising:

a nozzle having a frustoconical nozzle body that extends axially between an inboard nozzle end and an outboard nozzle end and defines a nozzle channel;

a nozzle extension having a frustoconical extension body that extends axially from an inboard extension end to an outboard extension end, wherein the inboard extension end is removably coupled to the outboard nozzle end at an interface via a connector extending annularly about the interface, and wherein the frustoconical extension body defines an extension channel that is axially aligned with the nozzle channel;

a first wedge ring and a second wedge ring sandwiching a portion of the nozzle with a portion of the nozzle extension along the interface by the connector; and an actuator in physical communication with the connector and configured to cause the nozzle extension to detach from the nozzle.

2. The rocket nozzle assembly of claim 1, wherein the connector comprises a V-band clamp.

3. The rocket nozzle assembly of claim 1, wherein the actuator comprises a pyrotechnic device, an explosive shaped charge, a hydraulic actuator, or an electromechanical actuator.

4. The rocket nozzle assembly of claim 1, wherein the nozzle comprises a removable portion configured to be replaced on a landing surface during refurbishment of the nozzle.

5. The rocket nozzle assembly of claim 1, wherein the outboard nozzle end comprises a nozzle flange that extends radially outward, and wherein the inboard extension end comprises an extension flange that extends radially outward, the connector comprising at least one clamp coupling the nozzle flange and the extension flange together.

6. The rocket nozzle assembly of claim 1, wherein the first wedge ring and the second wedge ring each comprise an angled surface.

7. The rocket nozzle assembly of claim 1, wherein the connector comprises one or more clamps and a strap extending circumferentially around at least the portion of the nozzle and the portion of the nozzle extension.

8. The rocket nozzle assembly of claim 1, wherein the actuator comprises an explosive bolt, a non-explosive bolt, a clasp, or a reverse pliers mechanism.

9. The rocket nozzle assembly of claim 1, wherein the portion of the nozzle comprises a nozzle flange and the portion of the nozzle extension comprises an extension flange.

10. A rocket system comprising:

a second stage rocket comprising one or more second stage rocket engines having a nozzle assembly configured to transform from a vacuum-optimized configuration to an atmospheric-optimized configuration, wherein the nozzle assembly comprises:

a nozzle having a frustoconical nozzle body that extends axially between an inboard nozzle end and an outboard nozzle end and defines a nozzle channel;

a nozzle extension having a frustoconical extension body that extends axially from an inboard extension end to an outboard extension end, wherein the inboard extension end is removably coupled to the outboard nozzle end at an interface via a connector extending annularly about the interface, and wherein the frustoconical extension body defines an extension channel that is axially aligned with the nozzle channel;

a first wedge ring and a second wedge ring sandwiching a portion of the nozzle with a portion of the nozzle extension along the interface by the connector; and an actuator in physical communication with the connector and configured to cause the nozzle extension to detach from the nozzle.

11. The rocket system of claim 10 further comprising a first stage rocket having one or more first stage rocket engines and configured to be coupled with the second stage rocket to launch the rocket system from within an atmosphere.

12. The rocket system of claim 10, wherein the actuator comprises a pyrotechnic device, an explosive shaped charge, a hydraulic actuator, or an electromechanical actuator.

13. The rocket system of claim 10, wherein the connector comprises one or more clamps and a strap extending circumferentially around at least the portion of the nozzle and the portion of the nozzle extension.

14. The rocket system of claim 10, wherein the portion of the nozzle comprises a nozzle flange and the portion of the nozzle extension comprises an extension flange.

* * * * *